June 20, 1944. T. L. BOWSER ET AL 2,351,584
THREE-DIMENSIONAL CROSS BAR SWITCH SYSTEM
Filed Aug. 18, 1942 27 Sheets-Sheet 1

FIG. 1

| FIG.20 | FIG.21 |
|--------|--------|

| FIG.17 | FIG.18 | FIG.19 |
|--------|--------|--------|
| FIG.14 | FIG.15 | FIG.16 |
| FIG.11 | FIG.12 | FIG.13 |

| FIG.9 | FIG.10 |
|-------|--------|

| FIG.6 | FIG.7 | FIG.8 |
|-------|-------|-------|
| FIG.3 | FIG.4 | FIG.5 |

| FIG.2 |
|-------|

INVENTORS.
T. L. BOWSER AND
F. H. SLAYMAKER
BY Winfred T. Powell
ATTORNEY.

June 20, 1944.   T. L. BOWSER ET AL   2,351,584
THREE-DIMENSIONAL CROSS BAR SWITCH SYSTEM
Filed Aug. 18, 1942   27 Sheets-Sheet 4

FIG. 4

INVENTORS
T. L. BOWSER AND
F. H. SLAYMAKER
BY Winfred T. Powell
ATT'Y.

INVENTORS
T. L. BOWSER AND
F. H. SLAYMAKER
BY Winfred T. Powell
ATT'Y.

INVENTORS
T. L. BOWSER AND
F. H. SLAYMAKER
BY Winfred T. Powell
ATT'Y.

INVENTORS.
T. L. BOWSER AND
F. H. SLAYMAKER
BY Winfred T. Powell
ATT'Y.

June 20, 1944.   T. L. BOWSER ET AL   2,351,584
THREE-DIMENSIONAL CROSS BAR SWITCH SYSTEM
Filed Aug. 18, 1942   27 Sheets-Sheet 10
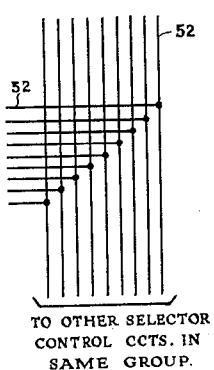
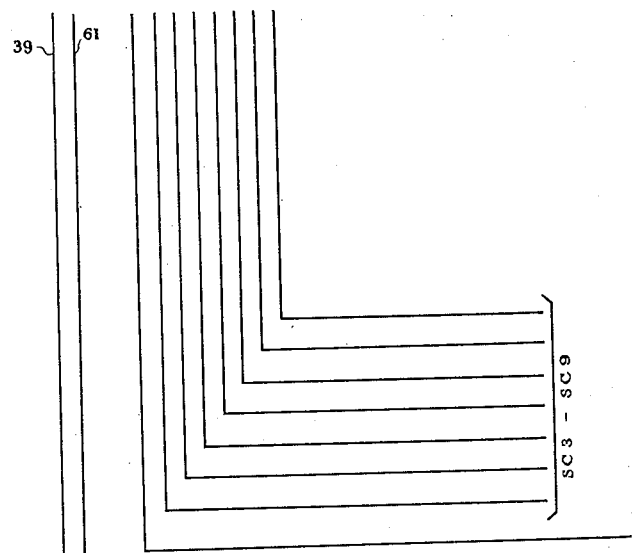
FIG. 10
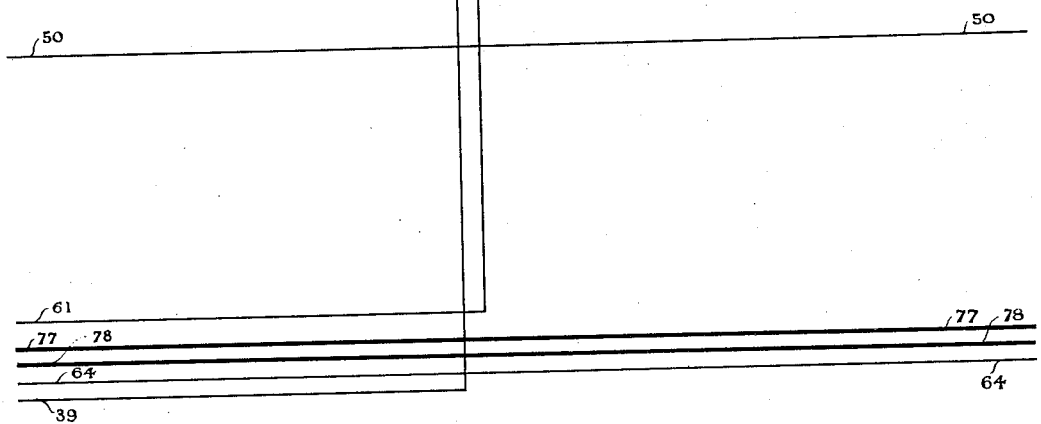
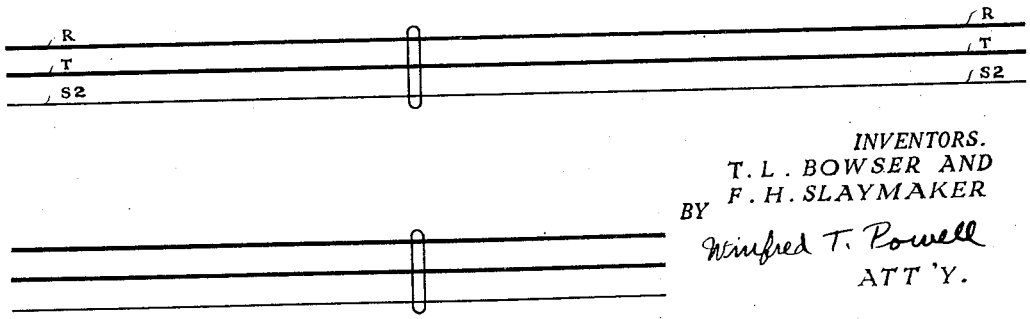
INVENTORS.
T. L. BOWSER AND
F. H. SLAYMAKER
BY Winfred T. Powell
ATT'Y.

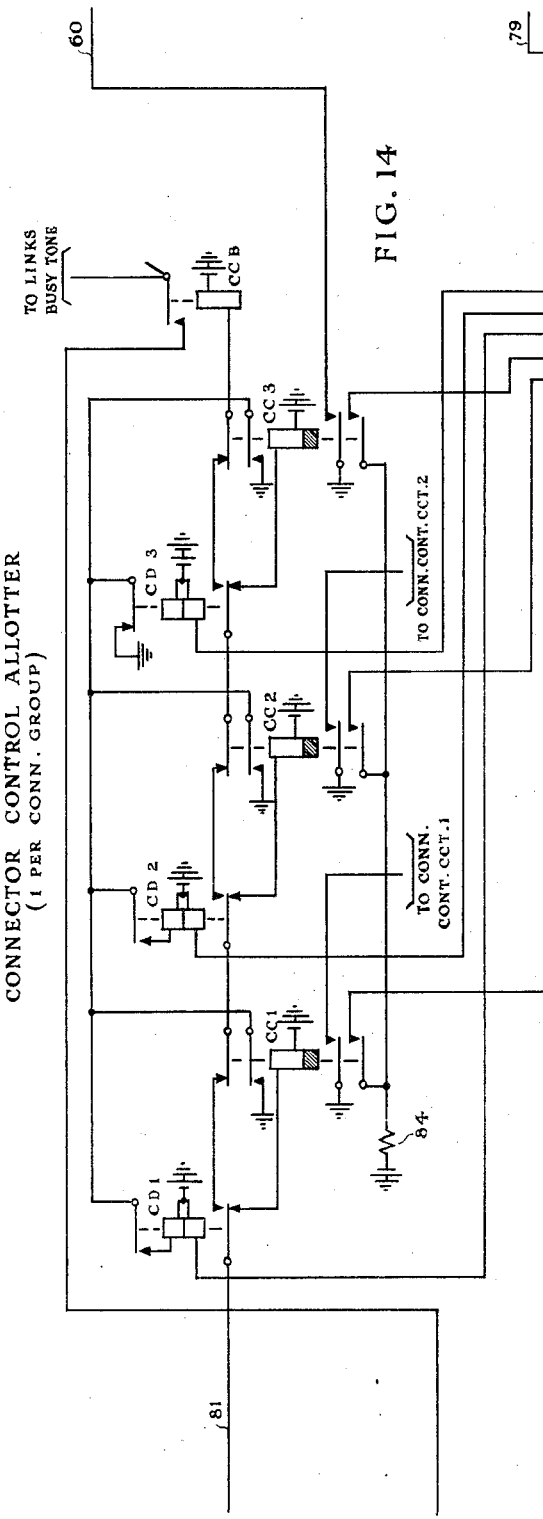
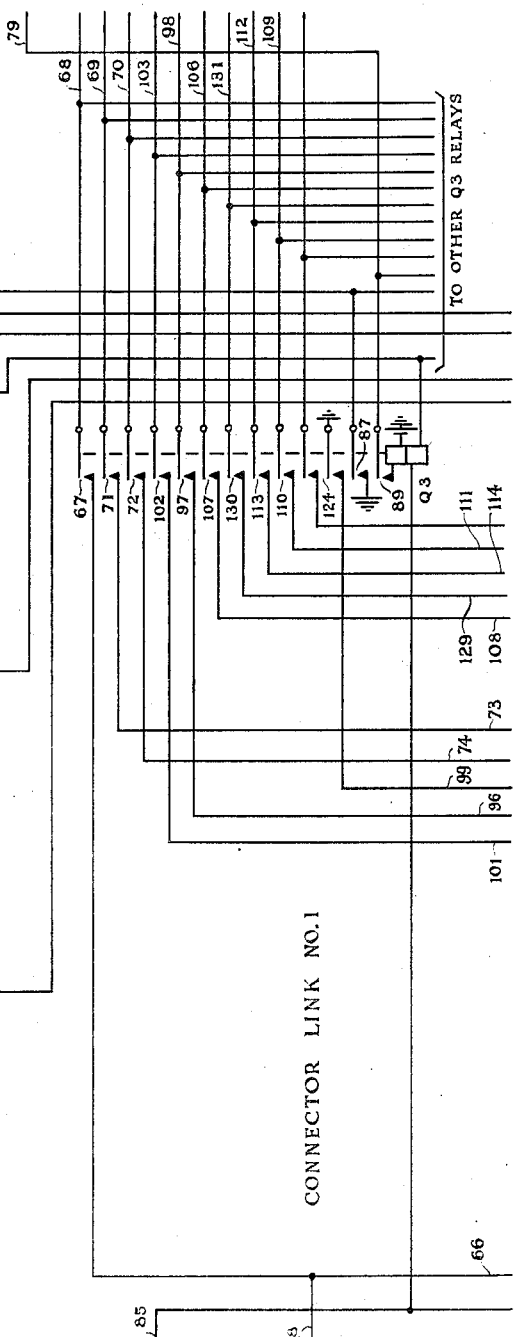
FIG. 14
INVENTORS.
T. L. BOWSER AND
F. H. SLAYMAKER
BY Winifred T. Powell
ATT'Y.

June 20, 1944.   T. L. BOWSER ET AL   2,351,584
THREE-DIMENSIONAL CROSS BAR SWITCH SYSTEM
Filed Aug. 18, 1942   27 Sheets-Sheet 17

INVENTORS
T. L. BOWSER AND
F. H. SLAYMAKER
BY
Winfred T. Powell
ATT'Y.

INVENTORS
T. L. BOWSER AND
F. H. SLAYMAKER
BY Winfred T. Powell
ATT'Y.

June 20, 1944. T. L. BOWSER ET AL 2,351,584
THREE-DIMENSIONAL CROSS BAR SWITCH SYSTEM
Filed Aug. 18, 1942  27 Sheets-Sheet 20

INVENTORS
T. L. BOWSER AND
F. H. SLAYMAKER
BY Winfred T. Powell
ATT'Y.

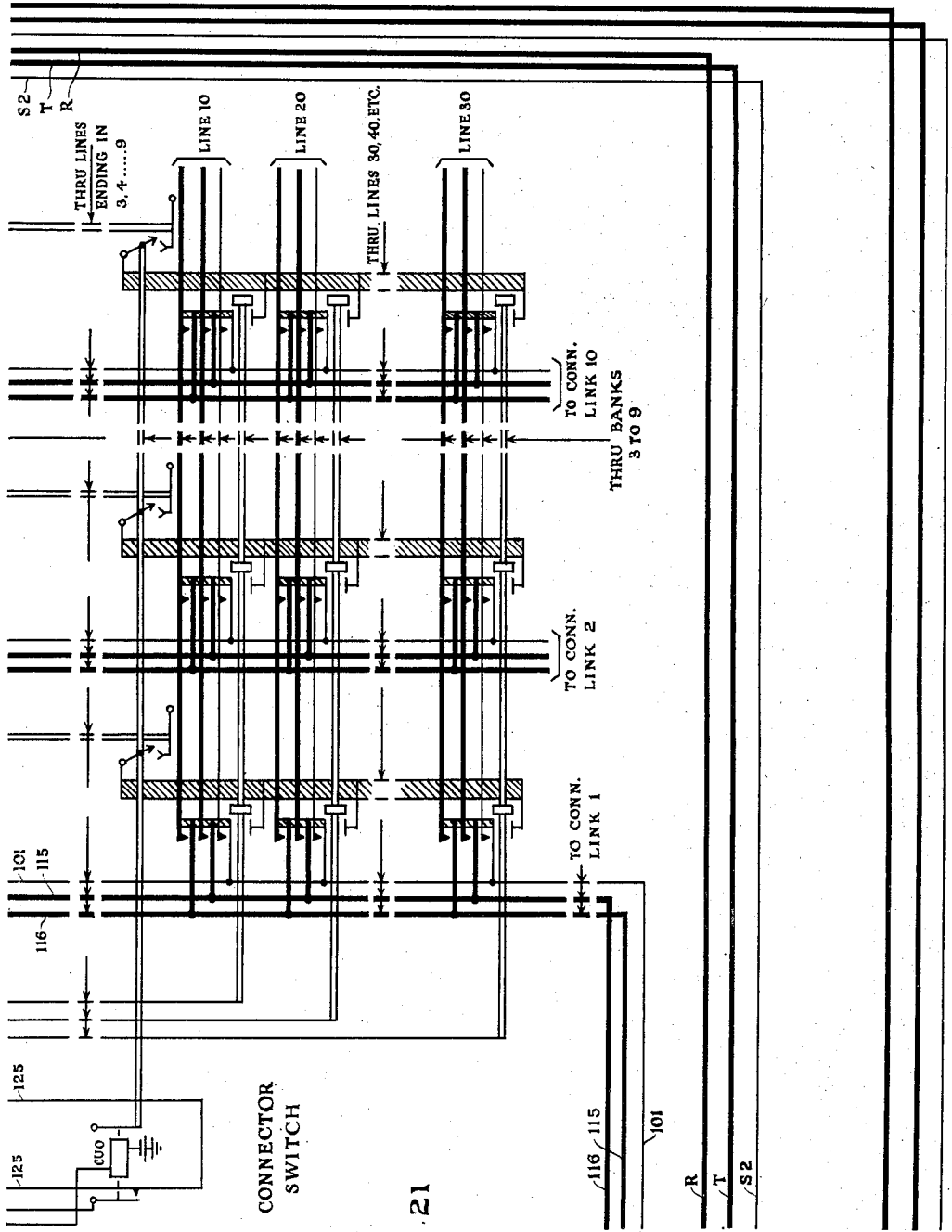

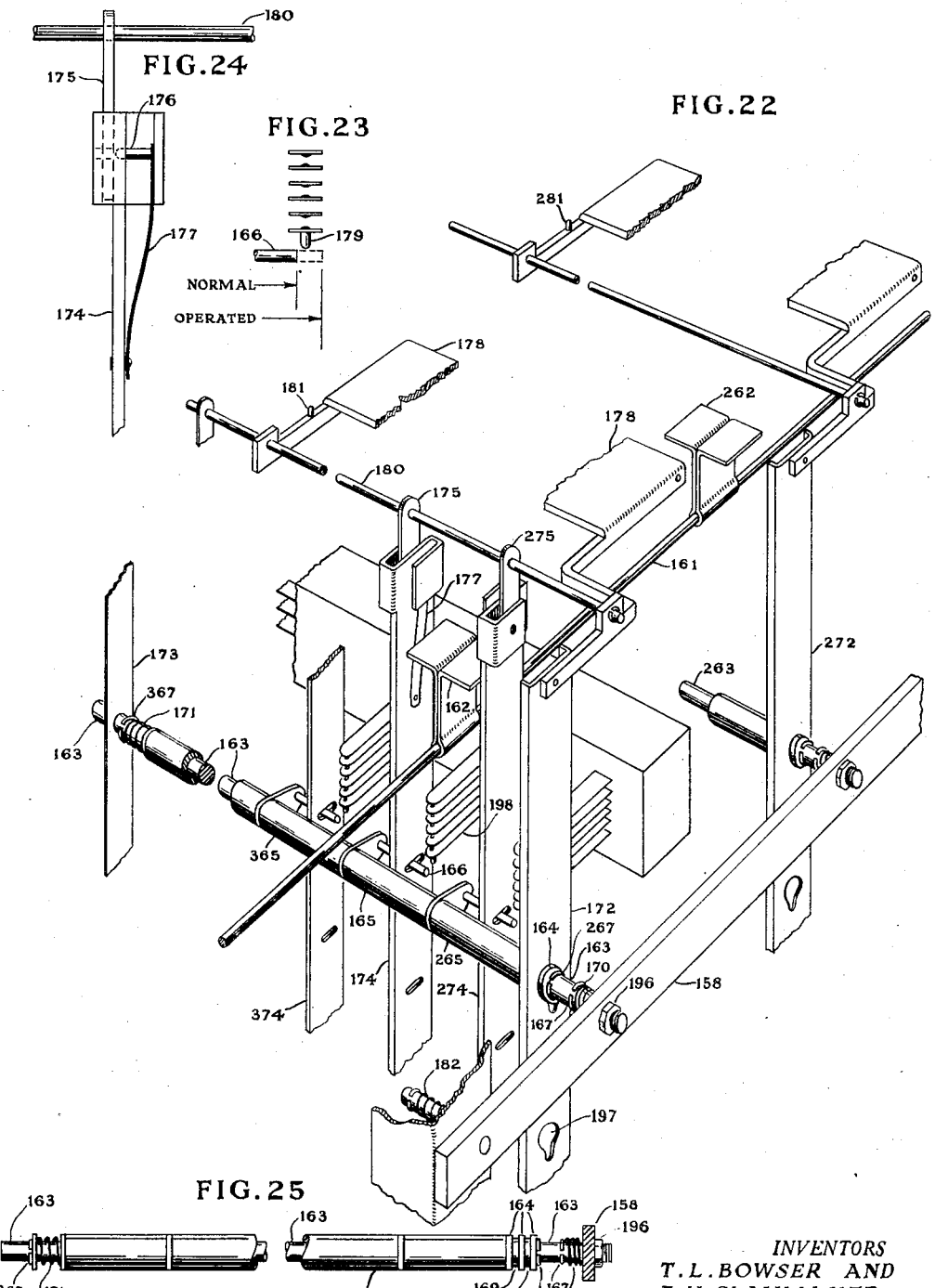

June 20, 1944. T. L. BOWSER ET AL 2,351,584
THREE-DIMENSIONAL CROSS BAR SWITCH SYSTEM
Filed Aug. 18, 1942 27 Sheets-Sheet 23

INVENTORS
T. L. BOWSER AND
BY F. H. SLAYMAKER

Winfred T. Powell
ATT'Y.

June 20, 1944.	T. L. BOWSER ET AL	2,351,584
THREE-DIMENSIONAL CROSS BAR SWITCH SYSTEM
Filed Aug. 18, 1942	27 Sheets-Sheet 25

*INVENTORS*
*T. L. BOWSER AND*
BY *F. H. SLAYMAKER*

Winfred T. Powell
ATT'Y.

June 20, 1944.   T. L. BOWSER ET AL   2,351,584
THREE-DIMENSIONAL CROSS BAR SWITCH SYSTEM
Filed Aug. 18, 1942   27 Sheets-Sheet 26
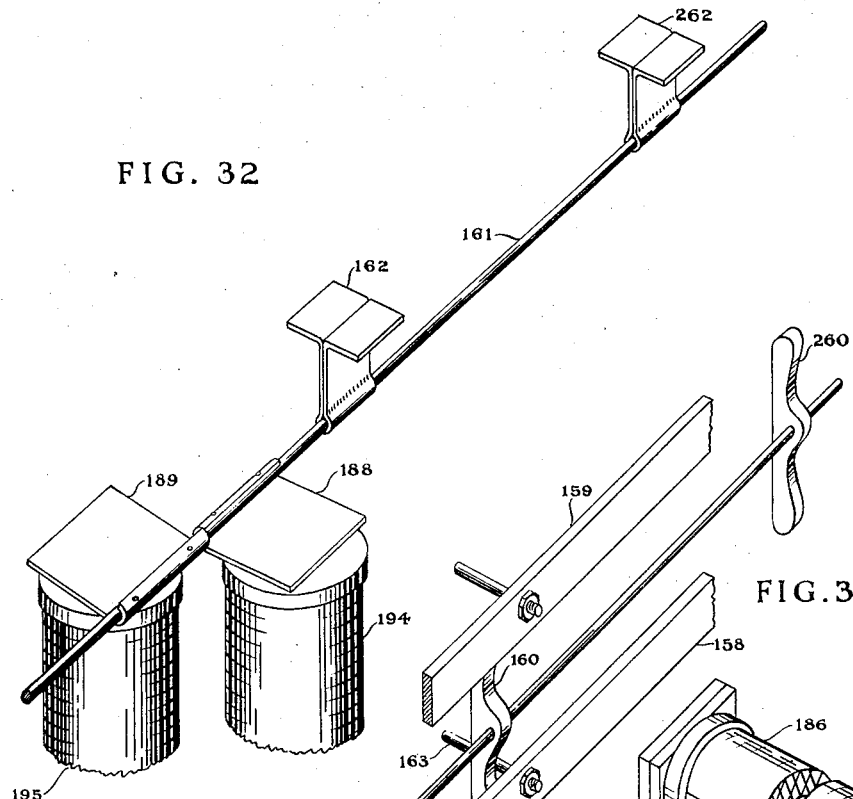
FIG. 32
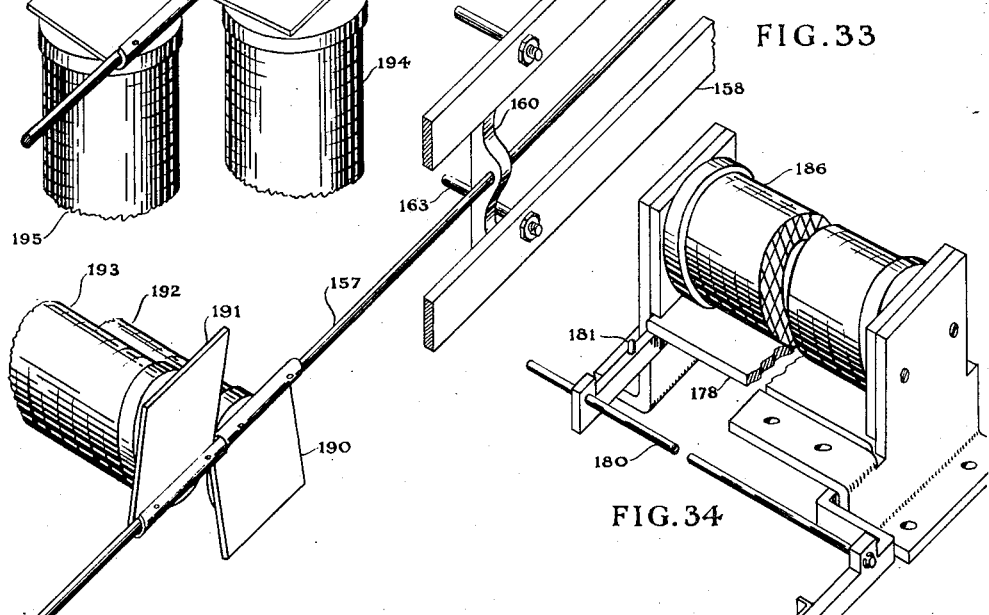
FIG. 33
FIG. 34
INVENTORS
T. L. BOWSER AND
F. H. SLAYMAKER
BY 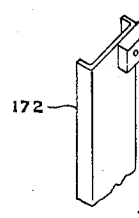
ATT'Y.

Patented June 20, 1944

2,351,584

UNITED STATES PATENT OFFICE 2,351,584

THREE-DIMENSIONAL CROSSBAR SWITCH SYSTEM

Theron L. Bowser and Frank H. Slaymaker, Rochester, N. Y., assignors to The Stromberg-Carlson Telephone Manufacturing Company, Rochester, N. Y., a corporation of New York Application August 18, 1942, Serial No. 455,196

12 Claims. (Cl. 179—22)

This invention relates to automatic devices and more particularly it has to do with the application of such devices to telephone exchange systems.

The object of the invention is an improved electrical switching mechanism by means of which a comparatively large number of connections may be set up in a simple and efficient manner.

A feature of the invention relates to a structure having a plurality of sets of operating bars arranged in groups, with magnets each operating a group of one set and other magnets each operating a bar in each group of another set, together with means cooperating with said bars to actuate circuit closing contacts.

Another feature relates to the provision of switching devices of the above described character for establishing connections whereby the operation of automatic selective switches is governed.

A further feature of the invention resides in the provision of a switch structure of the cross bar type in which the number of separate and individual selections which may be made is large compared with other switches of this type for a given number of operating magnets and bars.

Still another feature is the circuit arrangement whereby a plurality of connections may be established between a large group of incoming lines and a smaller group of outgoing lines for example, 100 incoming lines selectively connected to 10 outgoing trunks, all within a single cross bar switch structure. In other words, with the cross bar switch associated with a group of 100 telephone lines and a group of 10 trunks or link circuits, 10 simultaneous connections may be established from any 10 calling lines of the 100 line group to the 10 trunks or links by means of the single cross bar switch.

Another feature of the present invention relates to the circuit arrangement whereby connections may be established by way of selectors and connectors using a single cross bar switch unit for a complete selector group and a single cross bar switch for a complete connector group, all of which will be pointed out in detail in the following description.

The usual cross bar switch is of the 2-dimensional type, in which a plurality of vertical bars (10 for example) and a plurality of horizontal bars (5 for example, each having two separate and distinct selective positions) are actuated in various combinations to control the selection and operation of a number of individual contact sets at intersecting points of the cross bars. A switch of this type controls the selection of any one out of 100 points by determining the intersection of a set of 10 horizontal and 10 vertical geometric lines. The selection is made by operating only one of the 10 horizontal magnets and only one of the 10 vertical magnets of the switch. Or, the number of possible selections may be increased to 200, by providing 10 horizontal and 20 vertical magnets and associated bars.

In the present invention a 3-dimensional switch structure is provided, having 3 distinct motions for selectively closing any particular set of contacts in the switch. While any reasonable number of selecting and operating bars may be employed, the present disclosure comprises a switch structure having 30 magnets, 10 for selectively operating the associated units selector bars, 10 for selectively operating the associated tens selector bars and 10 for selectively operating the associated elevator or bank selector bars. Of these 3 motions, 2 are preliminary selective motions and the third controls the contact closure at the finally selected point.

More specifically, in the first motion a units selector bar moves a row of locking pins which are associated with a vertical plane of elevator bars. In the second motion a tens tie bar moves a horizontal plane of individual tens bars. In the third motion, which takes place in a vertical plane perpendicular to the planes mentioned above, a row of elevator links lying in the selected vertical plane is raised, but only the elevator bar which coincides with the intersection of the two vertical planes is lifted. Of the actuating pins linked with this particular elevator bar, only the one in the selected horizontal plane will be in position to control the closure of a contact set.

After the selection has been made, the tens and units selector bar magnets are released and the selected contact set is maintained closed by means of the bank or elevator selector magnet.

This invention has been illustrated in the accompanying drawings in which:

Figures 2 to 21 inclusive show the detailed circuits of a 3-digit selector type automatic telephone system. The circuits may be conveniently read by placing Figures 2 to 21 inclusive in the order illustrated in the key sheet, Figure 1.

Figures 22 to 35 inclusive show the mechanical construction of the 3-dimensional cross bar switch.

A detailed description will now be given of the construction and method of operation of the switch, reference being made to the mechanical drawings in which like reference characters represent like parts and in which Fig. 22 is a perspective view showing the fundamental operations of the switch.

Fig. 23 is a detailed view indicating the normal and operated positions of a contact set actuating pin with respect to a contact set.

Fig. 24 is a detailed view showing an elevator locking pin and its associated restoring spring.

Fig. 25 is a view showing one of the individual tens bars with its associated locking collar, stop rings and springs.

Fig. 32 is a perspective view showing the operation of a units selector bar by a pair of units selector magnets.

Fig. 33 is perspective view showing the relation between a tens selector bar operated by a pair of tens selector magnets, an individual tens bar and the tens tie bars.

Fig. 34 is a perspective view showing the operation of an elevator link lifting rod and its associated magnet with respect to a bank locking bar.

Figure 35:
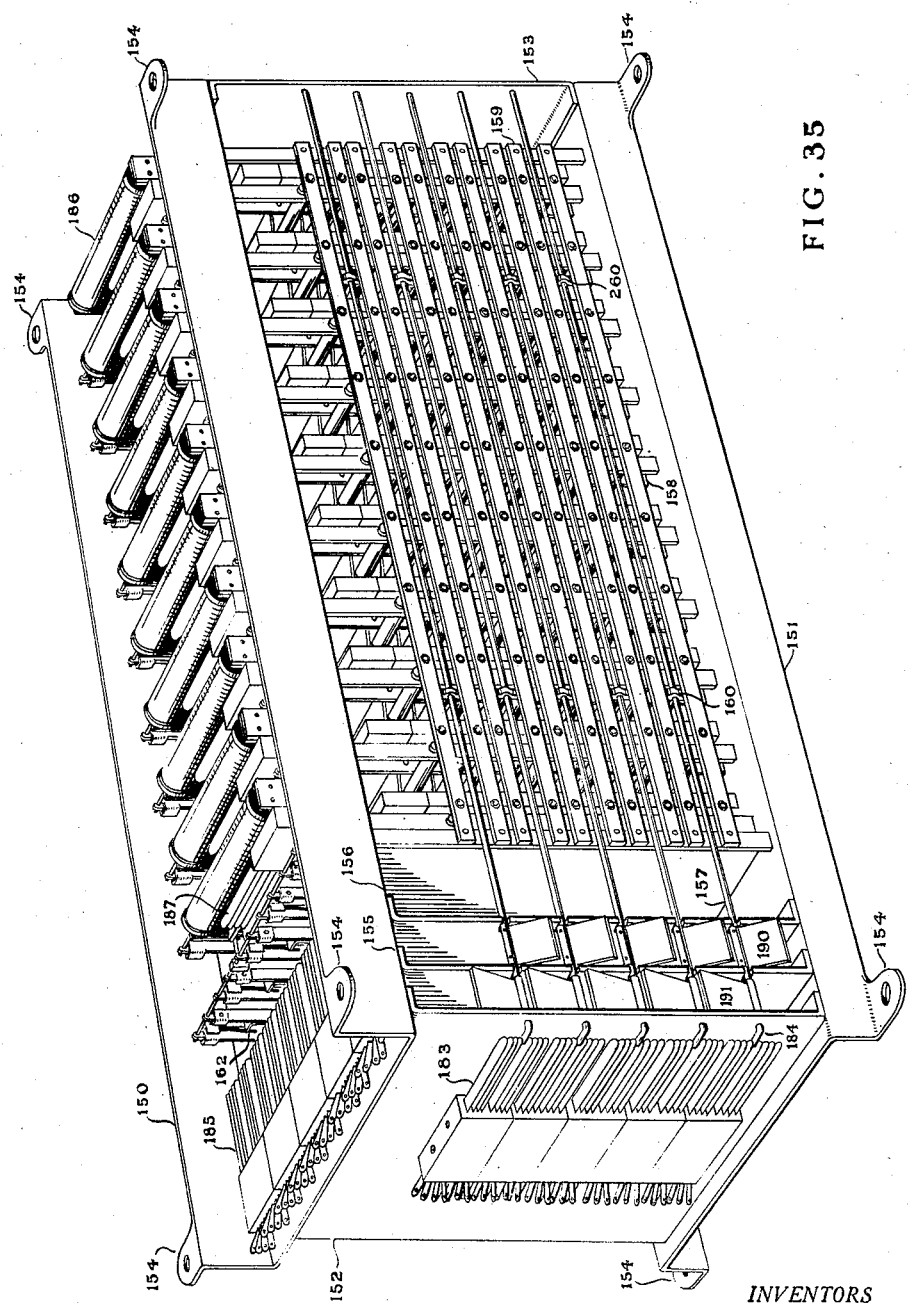
Fig. 35 is a perspective view of an assembled switch.

Referring now to the drawings and particularly to Fig. 35, the switch structure comprises various parts mounted on upper and lower frame members 150 and 151, secured together by end pieces 152 and 153. Out-turned lugs 154 are formed on the four corners of each frame member and are provided with mounting holes for fastening the switches to racks as is usually done with equipment of this type.

Mounted on the switch frame are vertical members 155 and 156, between which members and the end piece 152, the tens selector magnets are mounted. A tens selector bar, such as 157, is associated with a pair of tens selector magnets and is rotated in clockwise and counter-clockwise directions by armatures 190 and 191 which in turn are actuated by the tens selector magnets. Off-normal contact spring sets 183 are mounted on end piece 152 and are arranged to be operated by the tens selector bars by means of extensions on these bars, such as 184, the upper and lower sets being operated by armatures 190 and 191 respectively. Similar off-normal contact spring sets 185 are operated by means of extensions on the units selector bars.

Elevator link lifting magnets, such as 186, are mounted in the upper portion of the switch and their armatures, such as 178, are arranged to actuate off-normal spring contacts, such as 187, by means of actuating studs, such as 181, as more clearly seen in Figs. 22 and 34. The off-normal contacts are used in the circuits for locking and other functions which will be pointed out in the circuit description. It is believed that the operation of the switch will best be understood by referring to Figs. 22, 24, 32, 33 and 34 and pointing out the various functions effected in response to the circuit operation. In the circuit description which will be later given, one switch is used as a line finder, one as a first selector and one as a connector. It will be understood that these operations are effected in the line finder in response to the initiation of a call on a line and in the selector and connector in response to dial impulses.

The circuit operation in the switch is first the energization of the proper units and tens selector magnets, followed by the energization of the elevator or bank magnet. Referring to Fig. 32, the energization of units magnet 194 or 195 operates armature 188 or 189 to rotate units selector bar 161 for positioning units actuating fingers 162, 262, etc. to the right or left respectively. If for example, these fingers are moved to the left, they press springs such as 177 (Fig. 22) and their associated locking pins such as 176 to the left and through holes in the elevator links, such as 175. In this description, a 1000-point switch will be assumed in which switch there will be 10 units selector magnets for actuating 5 units selector bars like 161, only one of which may be actuated in one direction at any one time. Each units selector bar (through its 10 actuating fingers like 162) actuates 10 pins like 176, one in each elevator bar like 174 of the 10 elevators or banks in a row in line with bar 161. Operation of another bar like 161 (or 161 in its other direction) pushes pins like 176 through holes in the elevator bars of another row, there being 10 such rows.

Referring to Fig. 33, energization of tens magnets 192 or 193 operates armature 190 and 191 for rotating tens selector bar 157 which rocks tie bar actuating fingers 160, 260 etc. in a clockwise or counter-clockwise direction respectively. If for example, these fingers are moved in a clockwise direction, their upper portions press against and move an upper tens tie bar, such as 159, to the right, while their lower portions simply swing from the lower tens tie bar, such as 158, without operating it. In a 1000-point switch there will be 10 tens selector magnets for actuating 5 tens selector bars like 157, only one of which may be actuated at any one time. It will be understood that circuit means are provided for preventing the actuation of more than one of the units or tens selecting magnets at any one time. Each tens selector bar (through its actuating fingers like 160) actuates either one of two tens tie bars like 158—159. Each tens tie bar actuates 10 individual tens bars 163, 263, etc. as more clearly indicated in Fig. 22. Operation of another bar like 157 (or 157 in its other direction) presses fingers 160 or the like against other tens tie bars in other rows, there being 10 rows.

When the individual tens bars, such as 163, are actuated, each one carries its sleeves, such as 165, 265, 365, etc., with their associated actuating pins such as 166, into line below the spring actuating studs of the contact sets in the 10 rows associated with these actuated individual tens bars. Fig. 23 shows how one of these pins is positioned into (full lines) and out of (dotted lines) contacting relation with one of the contact set actuating studs. Sleeves such as 165, 265, 365, etc. are all actuated together longitudinally with the associated bar (except when locked as will be later described) and each sleeve is free for individual rotation on the bar.

When the elevator or bank magnet, such as 186, is energized, the elevator or bank armature, such as 178, of the allotted link circuit is actuated. The actuation of armature 178 lifts the elevator link lifting rod, such as 180, which in turn lifts the associated elevator links, such as 175, 275, etc., as well as the bank locking bar, such as 172. There are 10 links like 175 and one bar like 172 for each elevator. Only one elevator bar, such as 174, of the row is lifted, this being the one that is coupled to the elevator link by means of the pin such as 176. This lifting of elevator bar 174 rotates (by means of pins like 166) all 10 of the sleeves like 165 (not 265, 365, etc.) on the 10 individual tens bars in the same vertical row. Only one pin like 166 actuates a contact set and this is the one in the row associated with the actuated individual tens bar, such as 163, because this is the only pin which has been positioned to the right (as indicated in Fig. 23) by means of the actuated individual tens bar.

The units and tens magnets are now released but the elevator magnet remains energized throughout the connection. Release of the units magnet restores the units selector bar, such as 161, to normal by means of springs such as 177, restoring the actuating fingers, such as 162 to normal. Release of the tens magnet allows the actuated tens tie bar, such as 158, to be restored by means of the restoring springs, such as 182. The lifting of rod 180 by the elevator magnet and armature 178, holds the locked bar 174 up by means of pin 176 for keeping the contact set actuated by pin 166 and it will be noted that other pins like 166 controlled by bar 174 are in their upward position. It will be later pointed out how the individual tens bars are locked to prevent jamming the contacts under this condition. The individual tens bar is not restored to normal, being held in its operated position by means of locking bar 172. Another call can now be effected for operating the same or another units selector bar and the same or another tens tie bar for permitting another elevator magnet to actuate another contact set by means of another pin like 166, through the medium of another individual tens bar associated with the same or another level.

Figure 26:
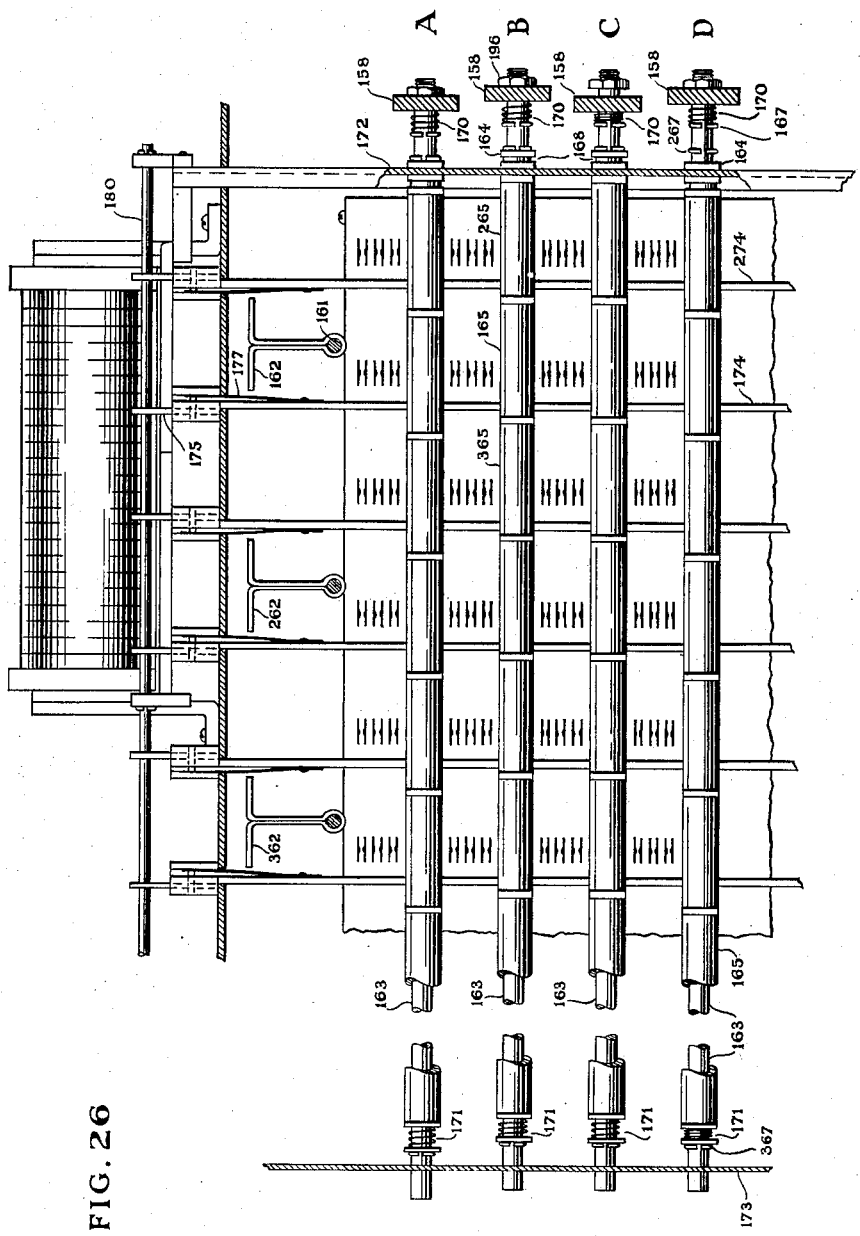
Fig. 26 is a left-side view of a portion of the switch showing the positions of the tens tie bar, the individual tens bar, stop rings, collars and springs under various operating conditions.
Figure 27:
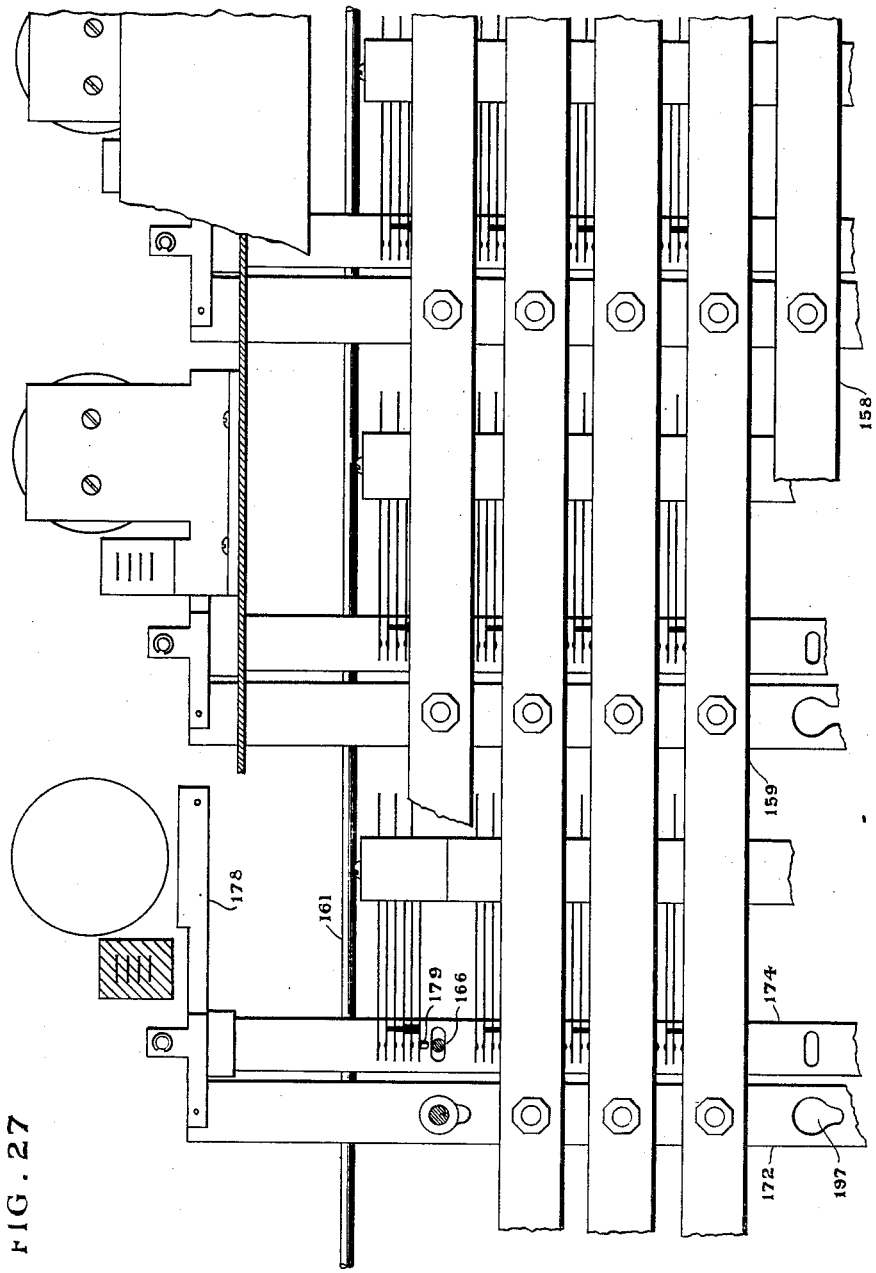
Fig. 27 is a front view of a portion of the switch showing various spring sets, units selector bar, elevator bars and actuating pins.

The position of an individual tens bar under various conditions has been illustrated in Fig. 26. Position A shows an individual tens bar, such as 163 and tens tie bar, such as 158, in normal position with no call in this bank.

In position B, the tens tie bar 158, has pulled the individual tens bar 163 and its associated sleeves, rings, springs and collar to the right, awaiting operation of the bank magnet. It will be understood that locking collar 164 (Fig. 25) is carried to the right through the large portion of the opening like 197 in bank locking bar 172.

In position C, tens bar 163 and its associated sleeves, rings, springs and collar have been pulled to the right by tie bar 158, the bank locking bar has been raised, (bank magnet still shown unoperated) bringing the restricted portion of the opening 197 into slot 169 of collar 164 and the tens magnet has been released for restoring tens tie bar 158 to normal. Individual tens bar 163 with its associated sleeves, etc., is locked in the operated position as shown, with spring 170 compressed by bar 158. This condition is maintained on this tens level in this bank until the connection is released, thus leaving this same tens tie bar 158 free to be again operated (to the right) on another call in the same tens group on another bank. In this case, spring 170 is simply restored and again compressed by bar 158 without changing the position of bar 163 and its associated sleeves, etc. and since no other elevator link of this group can be operated while the previously described connection is up, no other spring set in this group will be affected.

In position D, the bank magnet in the particular bank controlled by armature 178 of Fig. 22 for example, has been previously operated (still shown unoperated) to establish a connection in some level other than that controlled by bar 158 in Figure 22. This lifted bar 174 for example and all pins 166 associated therewith. Locking bar 172 was also lifted and in all levels except the one selected for the call, slots like 168 in collars like 164 were engaged at these other tens levels, including that shown in Fig. 22. Now when tens tie bar 158 is moved to the right in connection with a call in this particular tens level in another bank, means must be provided for preventing pin 166 of this tens level in this bank (which was raised when elevator 174 was raised on the previous call) from jamming into contact set 198. This is done by locking the locking bar 172 to slot 168 in collar 164 and the like. Now when bar 158 pulls bar 163 to the right, sleeve 165 (and others) is locked against longitudinal movement and spring 171 is simply compressed.

The elevator or bank armature is released by de-energizing the bank magnet which permits the spring pressure of the operated contact set to drop the elevator bar, after which spring 171 (or 170 in position C of Fig. 26) restores the individual tens bar to normal.

Figure 28:
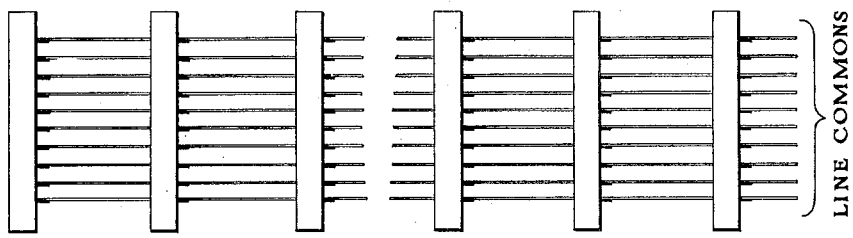
Fig. 28 is a side view showing how the line commons are arranged with respect to the banks of contact spring sets and associated terminal lugs.
Figure 29:
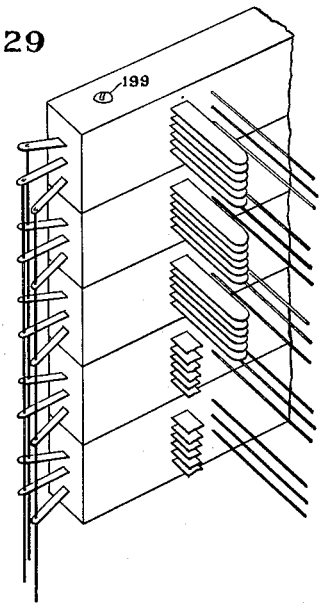
Fig. 29 is a front view perspective showing the arrangement of line and bank wire commons with respect to the contact sets.
Figure 30:
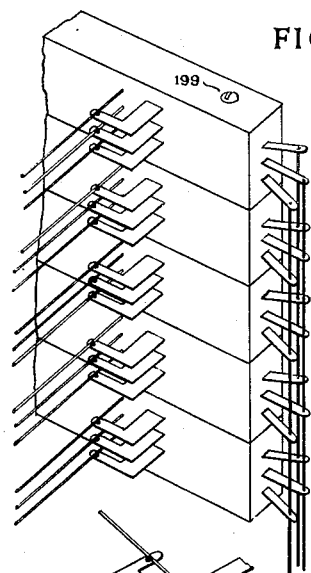
Fig. 30 is a rear view perspective, showing the arrangement of line and bank wire commons with respect to the contact sets.
Figure 31:
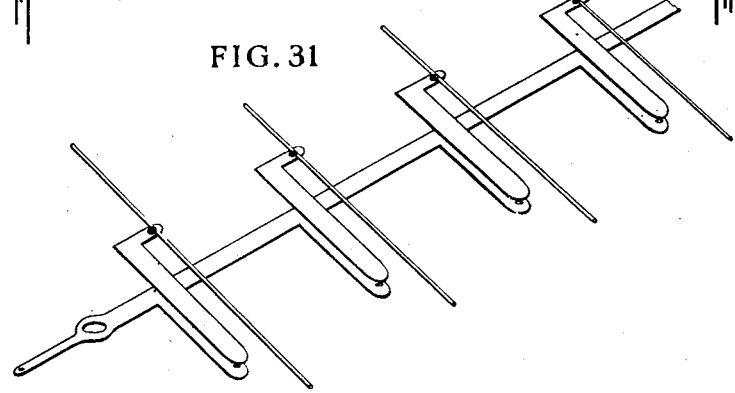
Fig. 31 is a detailed view of a portion of one bank contact with 4 associated line contacts and the wiring arrangement for connecting to the line contacts.

The contacts may be assembled or molded into forms as shown in Figs. 29 (front) and 30 (rear) with the different forms held together by screws like 199. Bare multiple wires may be threaded through holes in the forms and soldered or welded to the terminals as shown. Fig. 28 illustrates a preferred method of straight bare wire multipling between forms of contact sets.

A detailed description will now be given of the various circuit operations which control the selections and connections when an automatic connection is set up from a calling to a called telephone line.

*Calling line identification and selection*

It will be assumed that the subscriber at a sub-station on line #312 (which is diagrammatically indicated by these reference characters associated with a calling dial associated with this line circuit) initiates a call. It is not believed necessary to show the telephone sub-station circuits in detail, since it will be obvious that any approved type of common battery automatic telephone sub-station circuit will effect the functioning of the system in the manner to be described. This number indicates that line 12 in the 3 hundreds group is the line illustrated.

When the calling party removes the receiver from the telephone, the closed circuit across the line effects the operation of line relay ILR over a circuit extending from battery, common impedance coil IMP., conductor 13, right hand back contact of lock out relay ILO, right hand winding of relay ILR, inner left-hand back contact of cut-off relay ICO, over the calling line and sub-station in series, outer left-hand back contact of relay ICo and left hand winding of relay ILR to ground. The operation of relay ILR closes a circuit from ground at the outer left-hand front contact of this relay, to sleeve conductor S2, which extends to the connector bank terminal associated with this line and is for the purpose of making this line busy to incoming calls. It will be pointed out at this point that, in the event all links are busy, relay ALB of the selector link allotter will be operated for connecting a source of busy tone by way of condenser #14 to the line connection above described at the point where it connects to coil IMP. It will be later explained how relay ALB is operated when a call is initiated with all link circuits in the busy condition.

The operation of relay ILR closes a circuit at its inner left-hand front contact for operating the finder tens and units selecting magnets, extending from battery, resistance coil RES, inner left-hand back contact of finder units relay FU1, inner left-hand back contact of finder units relay FU2, through similar contacts of the other finder units relays, conductor 15, inner left-hand back contact of finder units relay FU0, conductor 16, middle back contact and winding of magnet FU2, conductor 17, inner left-hand back contact of relay ILO, inner left-hand front contact of relay ILR, outer left-hand back contact of relay ILO, conductor 18, winding of finder tens magnet FT1, middle back contact of magnet FT1, inner left-hand back contacts of all FT magnets in series to ground. The operation of magnets FT1 and FU2 in the line finder prepares the mechanical links of the cross bar switch for closing the proper individual contact set for connecting the calling line to the allotted link or selector circuit. For example, the operation of units magnet FU2 locks elevator link 175 to elevator bar 174 by means of locking pin 176. The operation of tens magnet FT1 carries the actuating pins like 166 and including 166 into line with their associated contact sets.

By means of the make-before-break contacts of the FT and FU magnets included in the above described circuit, the lock-out feature is provided whereby simultaneous calling lines are prevented from operating more than one tens or more than one units bar magnet at any one time. Furthermore, since there are only 10 FT magnets and 10 FU magnets serving a group of 100 lines, the circuits from these lines (similar to conductors 17 and 18) are connected to the tens and units magnets in various combinations. All lines in the same tens group are connected in common to the same FT magnet and all lines having the same units digit are connected to the same FU magnet.

*Allotting circuit*

The operation of any FT magnet and any FU magnet in combination completes a circuit for operating the link allotter relay and the selector control allotter relay of the allotted selector link. In the above example, this circuit extends from ground, outer left-hand front contact of magnet FT1, outer left-hand front contact of magnet FU2, conductor 19, lower back contact of relay LB1 and winding of relay LA1 to battery. This is assuming that link #1 is idle as evidenced by relay LB1 being in its normal position. If link #1 is busy, relay LB1 is operated. If link #2 is busy, relay LB2 is operated and so on for the corresponding LB relays, one of which is associated with each link circuit. The ground on conductor 19 is also extended to the selector control allotter and functions to operate the SA relay of the selector control circuit which is to be allotted for this call.

It will now be pointed out how the control of the allottment of the link circuits is effected whereby the links are allotted in rotation from 1 to 10, maintaining this sequence even though links become idle before the tenth one is selected. It was assumed that link #1 was allotted for the call from line #312 and that ground on conductor 19 operated relay LA1. When the final selection is made in the switch structure, ground will be extended back on conductor 23 (as will be later described) for operating relay LB1. The operation of relay LB1 opens up the circuit of relay LA1 which allows this latter relay to release after a slight delay due to its slow-acting characteristics and extend conductor 19 by way of a front contact of relay LB1 and back contact of relay LA1 to allotter relay LB2. Consequently, the next call which applies ground to conductor 19 will effect the operation of relay LA2, then when link #2 is seized relay LB2 will operate to transfer the circuit including conductor 19 to the next LB relay. As the successive links are allotted on successive calls the LB relays are operated and are locked by means of their upper front contacts and their upper windings to ground at the upper back contact of the last LB relay LB10. At the termination of any connection, the operating ground from the link is removed from the corresponding LB relay but the locking ground from the upper back contact of relay LB10 prevents the other LB relays from releasing until each link has been allotted in turn. When link #10 is finally allotted the LB10 relay is operated and ground is removed from the locking circuit controlling the other LB relays and all those associated with idle links are released.

In order to prevent the extension of ground on conductor 19 to a succeeding allotter circuit when the LB relay is operated and before the FT and FU magnets have time to release and remove this ground from conductor 19, the LA relays are made slow acting. In order to prevent the release of an LB relay if a link becomes idle while a succeeding link is being allotted and thus transfer the allotting circuit before the allotment is complete the LA relay connects ground to the common locking circuit of the LB relays to prevent the release of any of these latter relays as long as any LA relay is operated. Conductor 19 is extended to relay ALB of the selector link allotter when all links are busy, thus resulting in the operation of this relay when a call is initiated during this condition for applying the busy tone to the calling line.

With selector link #1 allotted as above described, the operation of relay LA1 closes a circuit from ground by way of its lower front contact, conductor 24 and winding of finder link magnet FL1 to battery. A circuit is now closed for operating relay LB1 which extends from ground on conductor 24, front contact of magnet FL1, conductor 23 and lower winding of relay LB1 to battery. Relay LB1 functions to extend the allotter circuit on to the next group of allotter relays in the manner already described and effect the release of relay LA1 by opening its lower back contact. The operation of magnet FL1 effects the closure of the contact set 25 which connects calling line #12 (of the 3 hundreds group) to link #1 of this group. This is accomplished by the elevator magnet FL1 lifting bar 174 through the mechanical linkage of link 175 and pin 176 and then the closure of the contact set 25 through the mechanical linkage of bar 174 and contact set 25 by means of pin 166. From the previous explanation of the operation of the units, tens and link operating magnets for controlling the selection and operation of the individual contact sets, it will be obvious how other combinations of FU and FT magnets function to prepare the circuit which is completed between a calling line and an allotted link by the operation of the FL magnet associated with the allotted link.

When calling line #12 is connected to link #1, the closed circuit across the tip and ring conductors T and R of this line, by way of contact set 25 and conductors 26 and 27, extends through back contacts of relay SL to front contacts of the selector link relays F1, F2 and F3. There are 3 of these relays F1, F2 and F3 associated with each selector link. The operation of relay F1 of link #1 for example, connects link #1 to the #1 selector control circuit. The operation of relay F2 of link #1 connects link #1 to the #2 selector control circuit, the operation of relay F3 of link #1 connects link #1 to the #3 selector control circuit. Similarly the operation of the F1, F2 or F3 relay of any other link connects this link to the selector control circuit #1, #2 or #3 respectively. It is proposed to provide a group of selector control circuits which is small compared with the number of selector links. Since the selector control circuits are used only during the hundreds digit dialing portion of the connection, it is believed that 3 will be sufficient for a group of 10 selector links. This is the reason for the 3 relays F1, F2, F3 for each selector link. It will be obvious that more than 3 selector control circuits can be provided and for each additional one, another F relay will be required for each selector link.

It will now be explained how the selector control allotter functions to allot the selector control circuit illustrated and it will be assumed that this is the #3 selector control circuit, which requires the operation of relay F3 to associate this selector control circuit with the #1 link circuit which was assumed selected by the calling station. Ground on conductor 19 extends through back contact of relay SB1 to the winding of relay SA1, but for this description it will be assumed that selector control circuits 1 and 2 are busy and that relays SB1 and SB2 are operated and that relay SB3 is normal. Ground on conductor 19 now extends through the lower front contact of relay SB1, outer upper back contact of relay SA1, lower front contact of relay SB2, outer upper back contact of relay SA2, lower back contact of relay SB3 and winding of relay SA3 to battery. This relay is operated over this circuit and at its lower-most front contact closes a circuit from battery through resistance 28, front contact of relay SA3, conductor 29 to one terminal of the lower winding of the F3 relays of all links. At the same time a circuit is closed from ground, lower front contact of relay LA1, conductor 30, to the other terminal of the lower windings of all F relays of this particular link circuit. Consequently, relay F3 will be the only F relay having both battery and ground connected to its operating winding, therefore this F3 relay will be operated.

The operation of relay F3 closes a circuit from ground, front contact 31 of relay F3, conductor 32, front contact and winding of magnet FL1 to battery which is effective to lock and hold magnet FL1 operated after relay LA1 releases. This locking circuit also extends by way of conductor 23 to relay LB1 for maintaining this relay in its operated position. A circuit is now closed for operating relay SB3 which extends from grounnd, front contact 33 of relay F3, conductor 34 and lower winding of relay SB3 to battery.

It is believed unnecessary to point out the sequence of allotment by the SA and SB relays of the selector control allotter since this is similar to that already explained in connection with the selector link allotter. It will be understood that the opening of the lower back contact of relay SB3 effects the release of relay SA3 but relay F3 is not released because of a locking circuit by way of its upper winding which will be presently described. Conductor 19 is extended to the winding of relay SCB when all selector control circuits are busy. Therefore, if a call is initiated when all selector control circuits are busy, relay SCB will operate and connect busy tone to the calling line by way of common conductor 13 which goes to all line relays and thence to all line circuits not switched away from their line relays by their cut-off relays.

With contact set 25 of the cross bar switch closed and with relay F3 of the selector link operated, the calling line circuit is extended to the control circuit of the selector link. This circuit may be traced from the windings of relay P of the selector link, front contacts 35 and 36 of relay F3, conductors 37 and 38, inner and middle right hand back contacts of relay SL, conductors 26 and 27, contact set 25, conductors T and R to the calling substation. The closed circuit of the calling line effects the operation of relay P. The cut-off and lock-out relays 1CO and 1LO are operated over a circuit extending from ground, front contact 31 of relay F3, conductor 39, contact set 25, sleeve conductor S1, right hand front contact of relay 1LR, winding of relay 1CO and winding of relay 1LO to battery. The operation of relay 1CO opens up and releases relay 1LR and the circuit to relay 1CO and relay 1LO is now completed by way of the right hand front contact of relay 1CO, which circuit is now connected through the back contact of relay 1LR to conductor S2. The release of relay 1LR effects the release of the FT and FU magnets which were operated when the call was initiated. The release of the FT and FU magnets removes ground from conductor 19 and renders the line finder switch available to handle another call.

*Selector circuit operation*

When the calling line circuit is extended to the windings of relay P of the selector link as above described, this relay will be operated and a circuit will be closed at its upper front contact for operating relay G. Relay DT is operated when relay SA3 operates over a circuit extending from ground, inner lower front contact of relay SA3, conductor 40 and winding of relay DT to battery. Relay Dt, at its lower front contact, connects the source of dial tone to the calling line, which is extended to relay P by way of condenser 41. Relay RS is also operated over a circuit extending from ground, inner lower front contact of relay SA3, conductor 42, winding of relay RS and resistance coil 43 to battery.

The operation of relay G closes a locking circuit for relay F3 which extends from ground, lower front contact of relay G, front contact 44 and winding of relay F3 to battery. Relay G also closes a locking circuit for relay DT which extends from ground, lower front contact of relay G, inner upper back contact of relay PP, upper front contact and winding of relay DT to battery. Relay G likewise closes a locking circuit for relay RS extending from ground, lower front contact of relay G, upper front contact of relay RS, winding of relay RS and resistance 43 to battery.

The calling subscriber now dials the hundreds digit followed by the tens digit, then the units digit and then the stations digit. For this description it will be assumed that #2123 is dialed. Before proceeding with the description of the line and station selecting operations however, a description will be given of the operation of the counting relays J1 to J6 inclusive of the selector control circuit when 10 impulses are transmitted. The executing circuits for the number selected by dialing the various digits are shown connected to the lower contacts of the J1 to J6 relays and lead off from the lower right hand portion of the drawings. It is not believed necessary to trace out these executing circuits for the various digit combinations, but it is believed sufficient to provide the following table which shows the J relays which will be operated and left operated at the end of each impulse.

| End of impulse | J relays operated |
|---|---|
| 1 | J1, J2 |
| 2 | J3 |
| 3 | J1, J2, J3, J4, |
| 4 | J3, J4, J5 |
| 5 | J1, J2, J3, J4, J5, J6 |
| 6 | J4, J5, J6 |
| 7 | J1, J2, J5, J6 |
| 8 | J3, J6 |
| 9 | J1, J2, J3, J4, J6 |
| 0 | J3, J4, J6 |

Assuming that 10 impulses are transmitted, relay P will be impulsed 10 times. At the release of relay P at the beginning of the first impulse, a circuit is closed for operating relay J1 which extends from ground, lower front contact of relay G, lower back contact of relay P, inner upper back contact of relay J1, winding of relay J1 and resistance 45 to battery. A locking circuit is closed for relay J1 which includes its winding, its inner upper front contact and conductor 46 which is connected to ground by way of upper front contact of relay D upper front contact of relay RS and lower front contact of relay G to ground. Relay D is operated at the beginning of the first impulse over a circuit extending from ground, upper back contact of relay P, inner upper front contact of relay G and winding of relay D to battery. Since relay D is slow acting it remains operated during the series of impulses for connecting ground on conductor 42 to conductor 46 to provide locking circuits for the various relays as will be pointed out.

The circuit to relay J1 extends to relay J2 in multiple, but this latter relay is short circuited and prevented from operating by means of ground extending through its inner upper back contact to the point between resistance 47 and the winding of the relay. When relay P is operated at the end of the first impulse, this short circuiting ground is removed at the back contact of relay P and relay J2 is operated in multiple with relay J1.

At the beginning of the second impulse, relay P releases and closes a circuit for short circuiting and releasing relay J1 which extends from ground, lower front contact of relay G, lower back contact of relay P, inner upper front contact of relay J2, to the point between resistance 45 and the winding of relay J1. Relay J2 is maintained in its operated position after relay J1 is released over a circuit including the inner upper back contact of relay J1, lower back contact of relay P and lower front contact of relay G to ground.

The release of relay J1 effects the operation of relay J3 over a circuit extending from ground on conductor 46, middle upper back contact of relay J1, outer upper front contact of relay J2, outer upper back contact of relay J4 and winding of relay J3 to battery. A locking circuit is now completed for relay J3 which extends from ground on conductor 46, middle back contact of relay J5, middle upper front contact and winding of relay J3 to battery. Relay PP is also operated when relay J1 releases, over a circuit in multiple with the winding of relay J3 which includes the lower winding of relay PP. Relay PP is locked operated over a circuit extending from ground, lower front contact of relay G, inner front contact and upper winding of relay PP to battery. The operation of relay PP opens up the locking circuit of relay DT at its middle upper back contact and, since the energizing circuit of relay DT is opened by the release of relay SA3, relay DT releases to remove dial tone from the calling line.

It will be observed that relay DT is not released until relay PP is operated during the second impulse period, which is for the purpose of maintaining dial tone on the calling line in the event that a false preliminary impulse effects the operation of the impulse relay to count off 1 impulse only. When only 1 impulse is transmitted by relay P, the DT relay will not be released because relay PP is not energized and, furthermore, the counting circuit is again placed in its normal condition by the release of relay D for removing ground from conductor 46 which is effective to release relays J1 and J2, thus placing the circuit in the same condition as if no impulse had been transmitted.

Proceeding now with the transmission of the remaining impulses of the 10 above assumed, when relay P is energized at the end of the second impulse, relay J2 is released by the opening of the lower back contact of relay P. During the remaining impulses, relays J1 and J2 are operated and released in the same manner above described; that is, at the beginning of each impulse, relay J1 is shifted from one position to another. At the beginning of each odd impulse, relay J1 is operated and locked as described in connection with the first odd impulse (No. 1) as above pointed out. At the beginning of each even impulse, relay J1 is released in the manner described in connection with first (No. 2) impulse as above described. Relay J2 is shifted in position at the end of each impulse, being operated at the end of each odd impulse and released at the end of each even impulse as described above in connection with the end of impulse #1 and the end of impulse #2.

Relay J4 is operated at the beginning of the third impulse over a circuit extending from ground on conductor 46, outer upper front contact of relay J1, outer upper back contact of relay J5, outer upper front contact of relay J3 and winding of relay J4 to battery and this relay is locked over a circuit including its inner lower front contact, inner lower front contact of relay J3 to conductor 46.

Relay J5 is operated at the beginning of the fourth impulse over a circuit extending from ground on conductor 46, middle upper back contact of relay J1, outer upper front contact of relay J2, outer upper back contact of relay J4, outer upper back contact of relay J6 and winding of relay J5 to battery. Relay J5 completes a locking circuit for itself including its inner lower front contact, middle upper front contact of relay J4 and conductor 46 to ground. The operation of relay J5 transfers the above described locking circuit of relay J3 from ground on conductor 46 by way of the middle upper back contact of relay J5 to the middle upper front contact of relay J5, middle upper back contact of relay J6 and conductor 46.

At the beginning of the fifth impulse, relay J6 is operated over a circuit extending from ground on conductor 46 outer upper front contact of relay J1, outer upper front contact of relay J5 and winding of relay J6 to battery. Relay J6 closes a locking circuit for itself including its inner upper front contact and conductor 46. The operation of relay J6 transfers the locking circuit of relay J3 (above described) from the middle upper back contact of relay J6, to the middle upper front contact of relay J6 and the middle upper front contact of relay J1 to conductor 46.

At the beginning of the sixth impulse, relay J3 is released because its locking circuit, including the middle upper front contact of relay J1, is opened since relay J1 is released during each even impulse period. The release of relay J3 transfers the locking circuit of relay J4 from the inner upper front contact of relay J3 to the inner upper back contact of relay J3 and the outer upper back contact of relay J1. Consequently, when relay J1 is operated at the beginning of the seventh impulse, this locking circuit is opened and relay J4 is released. The release of relay J4 transfers the locking circuit of relay J5 from the middle upper front contact of relay J4 to its middle upper back contact which includes the middle upper front contact of relay J1, so that when relay J1 is released during the eighth impulse period, relay J5 is deenergized and released.

Relay J3 is energized at the beginning of the eight impulse over a circuit extending from ground on conductor 46, middle upper back contact of relay J1, outer upper front contact of relay J2, outer upper back contact of relay J4 and winding of relay J3 to battery. A locking circuit for relay J3 now extends by way of its middle upper front contact, middle upper back contact of relay J5 and conductor 46. At the beginning of the ninth impulse, relay J4 is operated over a circuit extending from ground on conductor 46, outer upper front contact of relay J1, outer upper back contact of relay J5, outer upper front contact of relay J3 and winding of relay J4 to battery. Relay J4 locks over a circuit including its inner upper front contact and inner upper front contact of relay J3 to conductor 46. The tenth impulse is effective to release relay J1 and at the end of this impulse J2 is released. This impulse is ineffective to change the condition (operated) of relays J3, J4 and J6 over that described for the ninth impulse. However, after the ninth impulse is transmitted, relays J1 and J2 are left operated which differs from the condition after the tenth impulse when these two relays are deenergized.

It will now be explained how the selector functions in response to the dialing of No. 2 for the hundreds digit. From the above description, it will be noted that relay D is operated at the beginning of the first impulse and is released only at the end of the final impulse of the series, in this case the second impulse. From the above table it will be observed that relay J3 is in its operated position when relay D is released following the transmission of two impulses.

Execution in accordance with the hundreds digit is now effected and this is accomplished by operating the SX relay of the selector control lock-out circuit, only one of which may be operated at any one time. The selector control lock-out circuit is for the purpose of preventing more than one selector control circuit in the same selector group from gaining access to the selector switch at the same time. Since there is one SX relay for each selector control circuit and since it was assumed that the No. 3 selector control circuit was used on this call, it now becomes necessary to operate relay SX3. The circuit for operating relay SX3 extends from ground, lower front contact of relay G, lower back contact of relay D, lower front contact of relay PP, lower front contact of relay RS, conductor 48, winding of relay SX3 and through the series circuit including the contacts of the other SX relays to battery. This series circuit prevents the operation of more than one SX relay at any one time even though another selector control circuit attempts to execute at this time. Relay SX3 closes a locking circuit for itself including its inner upper front contact and its outer upper front contact, both of which open up the series circuit for other SX relays.

*Connector circuit operation*

A circuit is now closed for operating relay H2 of the selector group lock-out circuit which extends from the ground which is applied to the right-hand terminal of relay SX3, inner lower front contact of relay SX3, conductor 49, lower back contact of relay J4, lower back contact of relay J6, lower front contact of relay J3, conductor 52, winding of relay H2, outer left hand back contact of relay H2 and over the series circuit including all other H relays of the selector group to battery by way of resistance 80. Relay H2 closes a locking circuit for itself at its left-hand make-before-break contacts and opens up the series circuit of other H relays to prevent two selector control circuits in different selector groups from obtaining access to the same connector group at the same instant. Magnet SH2 of the selector switch is now operated over a circuit extending from ground on conductor 52 (above described), conductor 54, which conductor extends from the selector group lock-out circuit to the selector switch (with other conductors as indicated by the single line 53) and winding of relay SH2 to battery. It will be understood that the SH2 magnet is selectively operated because No. 2 was the hundreds digit dialed. Other SH magnets are selectively operated in response to other hundreds digits in accordance with the setting of the J relays of the selector control circuit.

It now becomes necessary to operate the SC magnet of the selector switch and the SL magnet of the selector switch in accordance with the connector link which was allotted. It will be assumed that connector No. 1 is allotted, consequently relay CA1 of the connector link allotter is operated over a circuit extending from ground, front contact 59 of relay H2, conductor 55, lower back contact of relay CB1 and winding of relay CA1 to battery.

It also becomes necessary to select the connector control circuit which is allotted and it will be assumed that the No. 3 connector control circuit is selected for use on this call. It is proposed to provide a group of connector control circuits which is small compared with the number of connector links. Since the connector control circuits are used only during the dialing of the tens, units and stations digits, it is believed that 3 will be sufficient for a group of 10 connector links. That is the reason for the 3 relays Q1, Q2, and Q3 for each connector link. It will be obvious that more than 3 connector control circuits can be provided and for each additional connector control circuit, an additional Q relay will be required for each connector link. A circuit is now closed for operating relay CC3 of the connector control allotter, extending from ground on conductor 55, conductor 81, lower front contact of relay CD1, outer upper back contact of relay CC1, lower front contact of relay CD2, outer upper back contact of relay CC2, lower back contact of relay CD3 and winding of relay CC3 to battery. It will be understood that the connector link allotter and connector control allotter function in the same manner as the selector link allotter and the selector control allotter above described, by selectively allotting the connector links and the connector control circuits in rotation from the first to the last, irrespective of the busy or idle condition of the allotted circuits in the series.

Magnet SC1 is now operated over a circuit extending from ground, lower front contact of relay CA1, conductor 57, front contact 58 of relay H2, conductor 56 and winding of magnet SC1 to battery. With any combination of SH and SC magnets operated, a circuit is closed for operating the SL magnet of the selector link, in this case magnet SL1, because connector #1 was assumed to be the one allotted. This circuit extends from ground, left-hand front contact of magnet SH2, conductor 82, left-hand front contact of magnet SC1, conductor 50, outer lower front contact of relay SX3, conductor 51, contact 83 of relay F3, conductor 61 and winding of magnet SL1 to battery. It will be noted that ground on conductor 51 leads to a point between relay RS of the selector control circuit and resistance 43. This is effective to short circuit and release relay RS for releasing the selector control circuit as will be presently described. The operation of magnet SL1 closes a locking circuit for itself which includes conductor 39, which conductor is connected to ground at contact 31 of relay F3.

Referring to the selector control circuit, the release of relay RS removes ground from conductor 46 by opening its upper front contact which is effective to release relay J3 (or any other combination of J relays which may have been left operated). Relay RS also effects the release of relay SX3 by opening the circuit of this relay at its lower front contact. Since the circuit to relay SX3 is also extended by way of conductors 49 and 52 to relay H2 of the selector group lockout circuit, this latter relay is likewise released. Magnet SH2 of the selector switch is now released and made available for use again because the ground on conductor 52 (extended by way of conductor 54) is opened by the release of relay RS. Magnet SC1 is now released and made available for use again because its operating circuit is opened by the release of relay H2.

Relay SL of the selector link is now operated to switch the calling line circuit from the selector control circuit to the connector control circuit. The operating circuit for relay SL extends from ground, lower front contact of relay G, lower back contact of relay D, lower front contact of relay PP, lower back contact of relay RS, front contact 63 of relay F3, conductor 62 and winding of relay SL to battery. Relay SL is locked over a circuit including conductor 39 to which ground is connected at front contact 31 of relay F3. The switching of the line circuit from the selector control circuit to the connector control circuit effects the release of relay P which in turn opens up and releases G. Between the release of relay P and the release of relay G, the operating circuit of relay D is closed and this relay operates but performs no function at this time.

Relay G removes ground from the locking circuit of relay F3, permitting this relay to release which in turn removes ground from conductor 34 for releasing relay SB3 so that this selector control circuit may be allotted again. The release of relay F3 also opens up the above described locking circuit for relay SL, but before this circuit is opened, relay 1G of the connector control circuit will have been operated to lock relay SL as will be presently described. The release of relay G effects the release of relay PP by opening its locking circuit at the lower front contact of relay G. The relays of the selector control circuit are now in their normal condition ready for use again.

Relay Q3 of the connector link is now operated because battery which is connected to the lower right hand terminals of all Q3 relays by way of resistance 84, outer lower front contact of relay CC3, finds ground on the left-hand terminal of the lower winding of relay Q3 of the first connector link only, because relay CA1 is operated extending this ground through its lower front contact, conductor 85, and lower winding of relay Q3. Relay 1RS of the connector control circuit is now operated over a circuit extending from ground, inner lower front contact of relay CC3, conductor 60, winding of relay 1RS and resistance 86 to battery. Relay CD3 of the connector control allotter is now operated over a circuit extending from ground, front contact 87 of relay Q3 and lower winding of relay CD3 to battery. The opening of the lower back contact of relay CD3 opens up and releases relay CC3.

Relay 1P of the connector control circuit is operated when relay SL of the selector link operates to extend the calling line by way of the selector switch contact 65, conductors 75 and 76, back contacts of make-before-break combinations of relay CL of the connector link, back contacts of the make-before-break combinations of relay R of the connector link, conductors 73 and 74, front contacts 71 and 72 of relay Q3, conductors 69 and 70 and windings of relay 1P of the connector control circuit. Relay 1P closes an obvious circuit for operating relay 1G. Relay 1G connects ground to conductor 68 which extends back through front contact 67 of relay Q3 and conductor 88 to the lower winding of relay CB1 for operating this relay. The operation of relay CB1 effects the release of relay CA1 and CB1 locks itself by way of its upper winding until the last allotter circuit is taken for use and, of course relay CB1 is held operated even when the last allotter circuit is used as long as the connector link is busy, this because of the ground on conductor 88 above traced.

Figure 2:
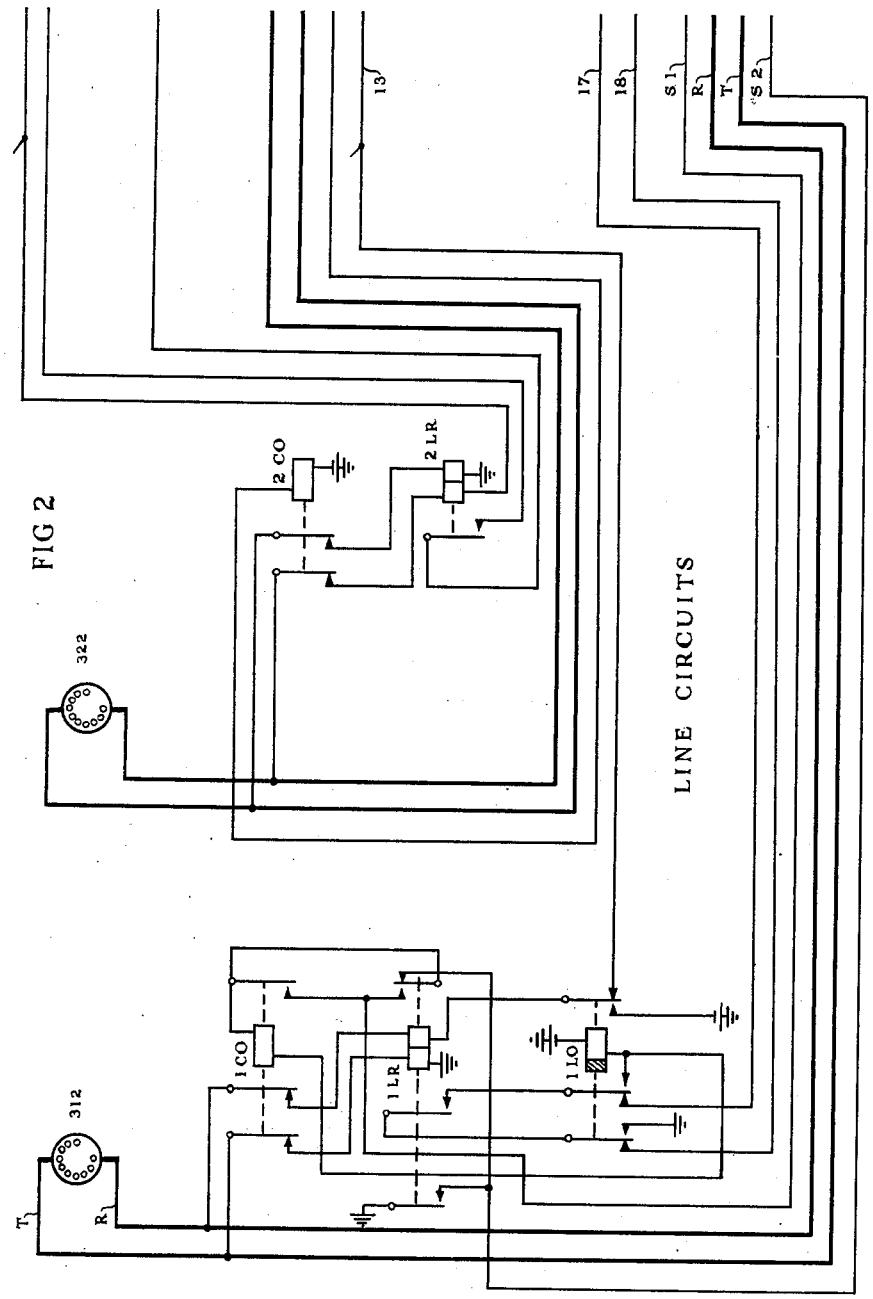
Figure 3:
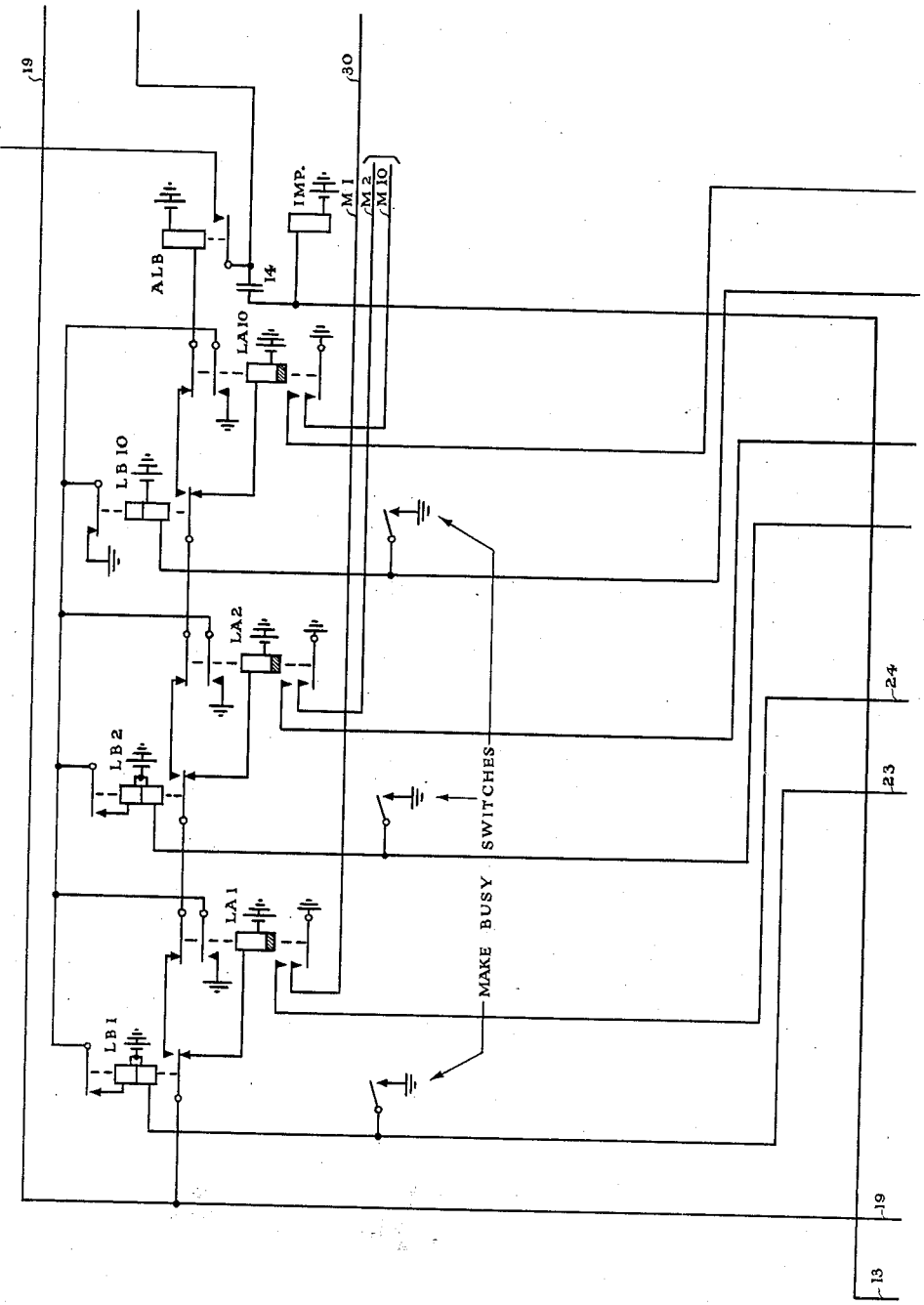
Figure 5:
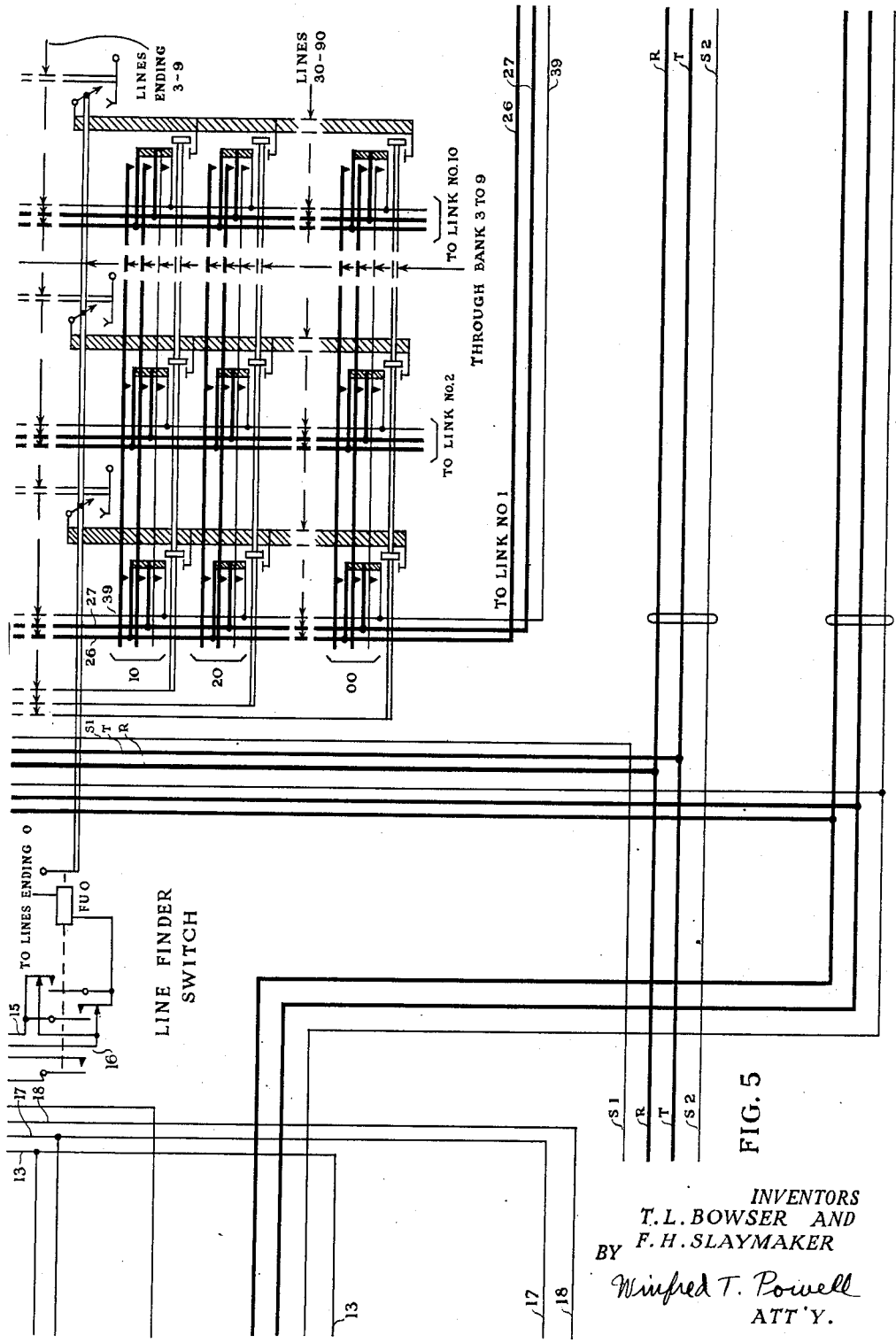
Figure 6:
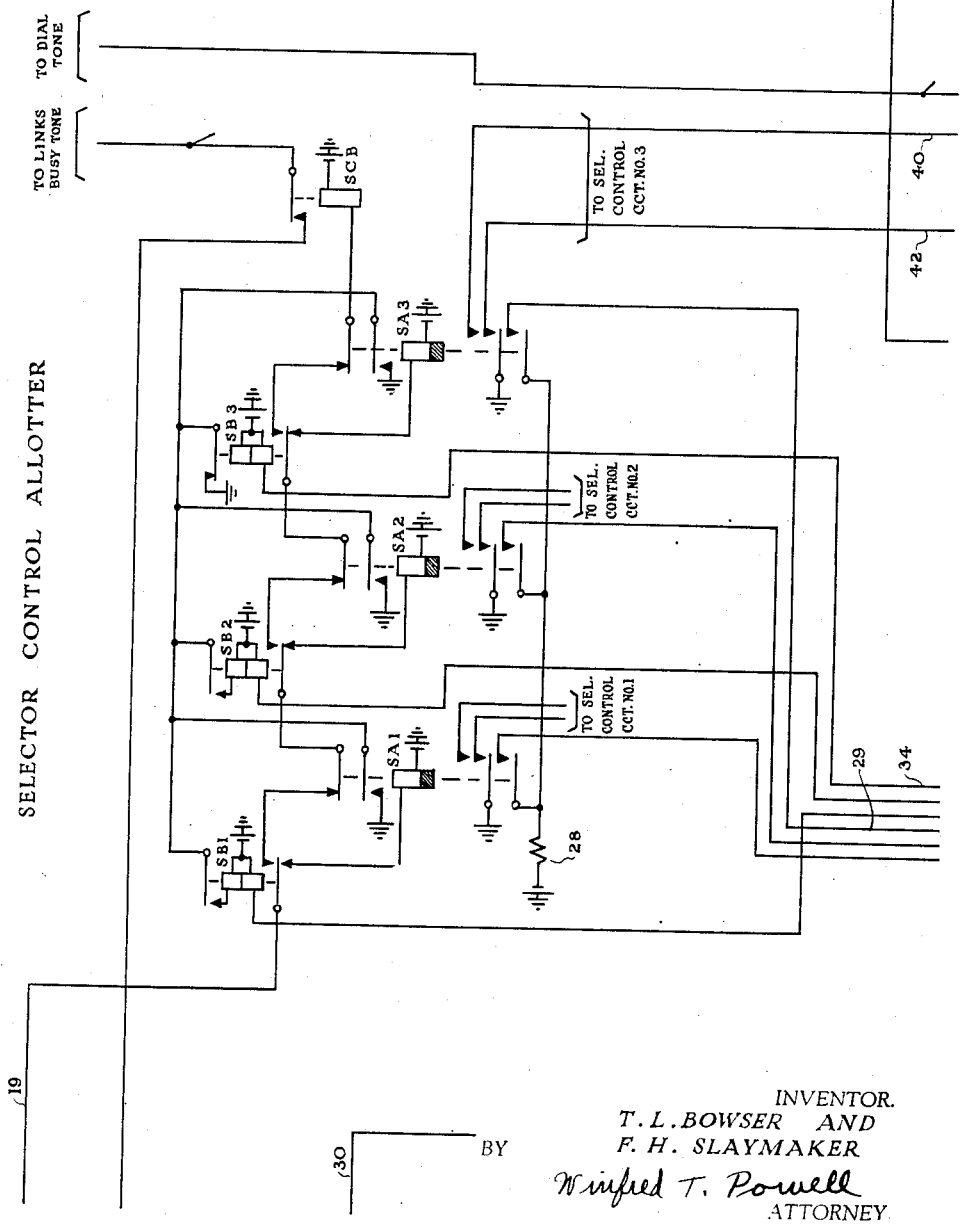
Figure 7:
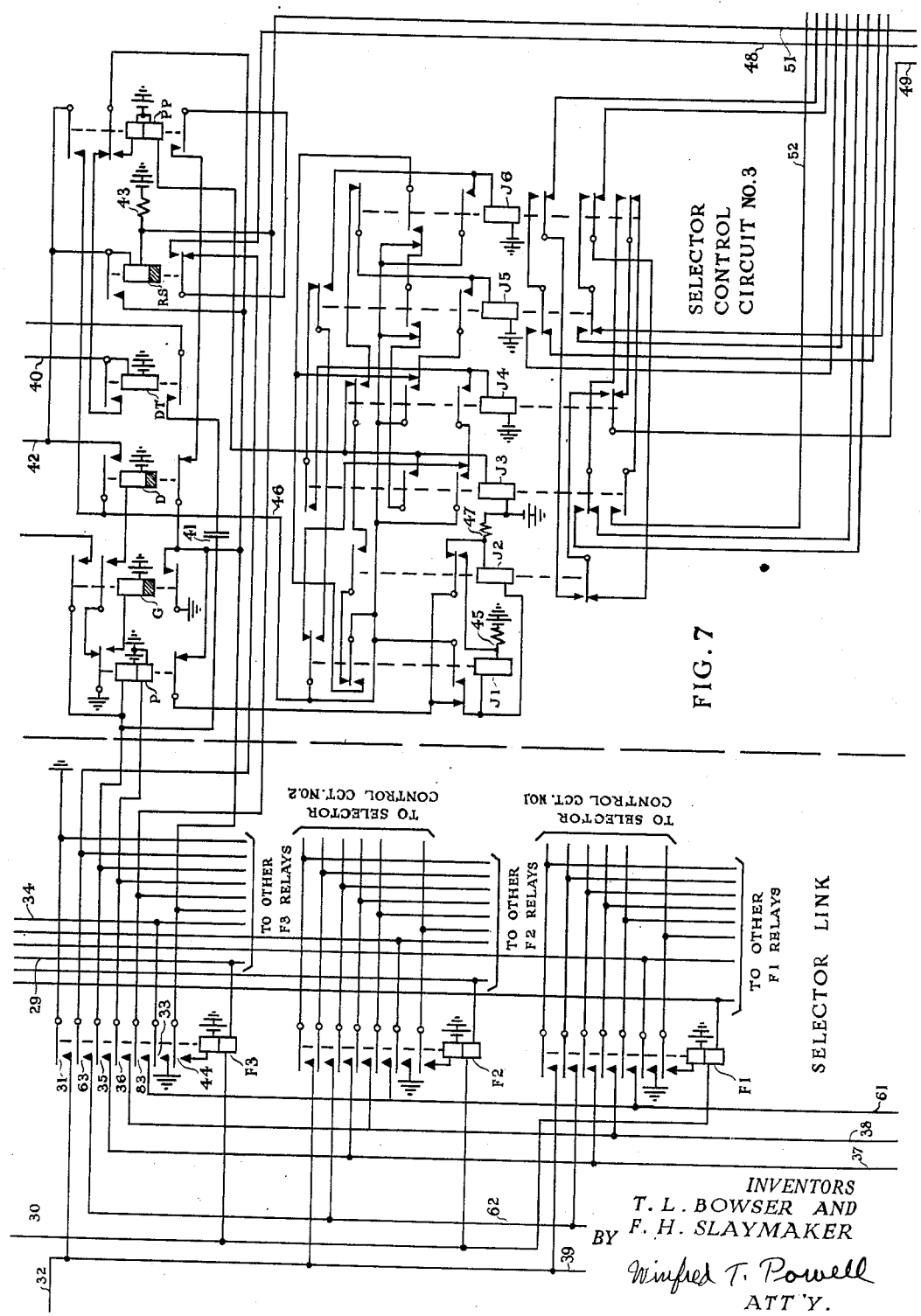
Figure 8:
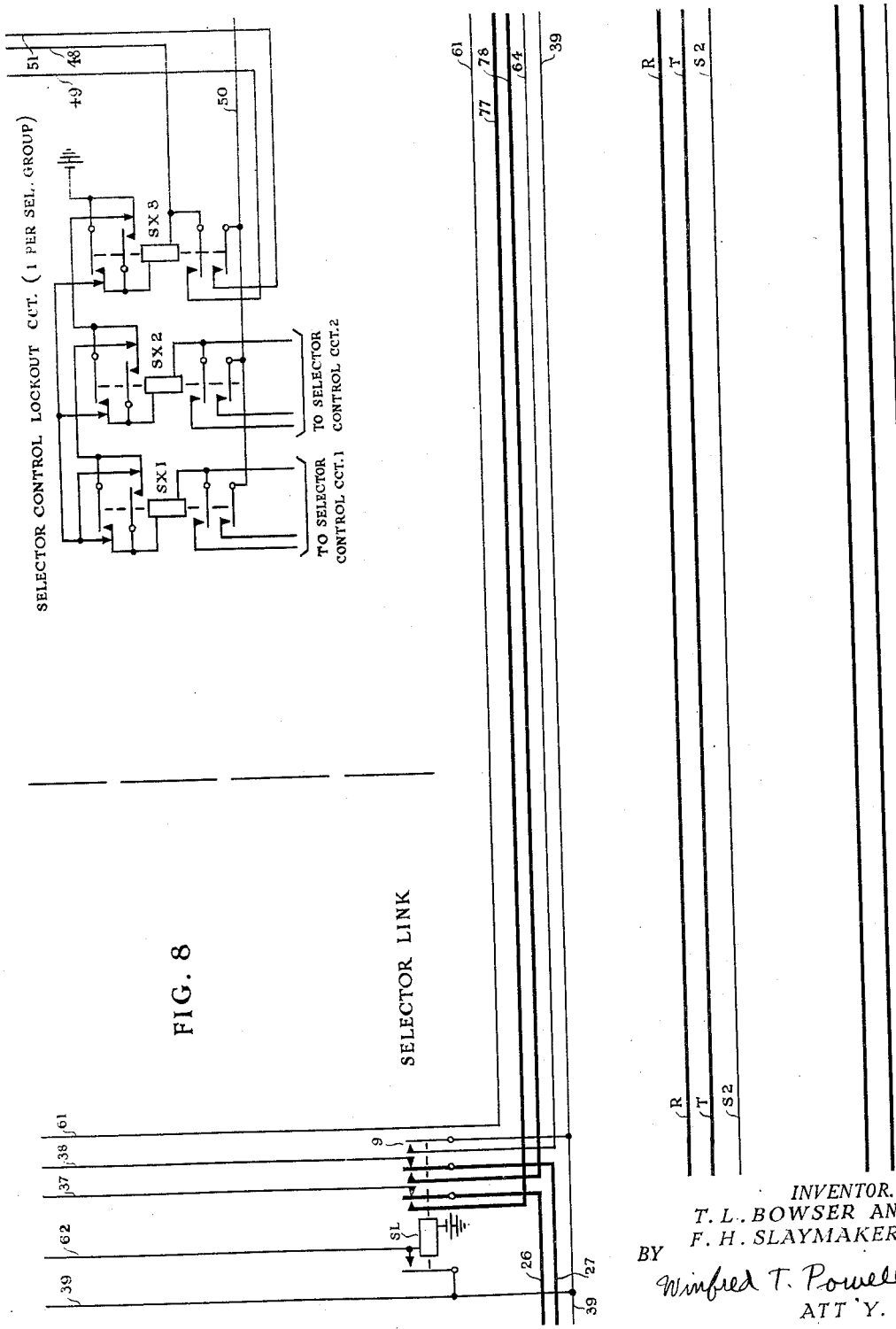
Figure 9:
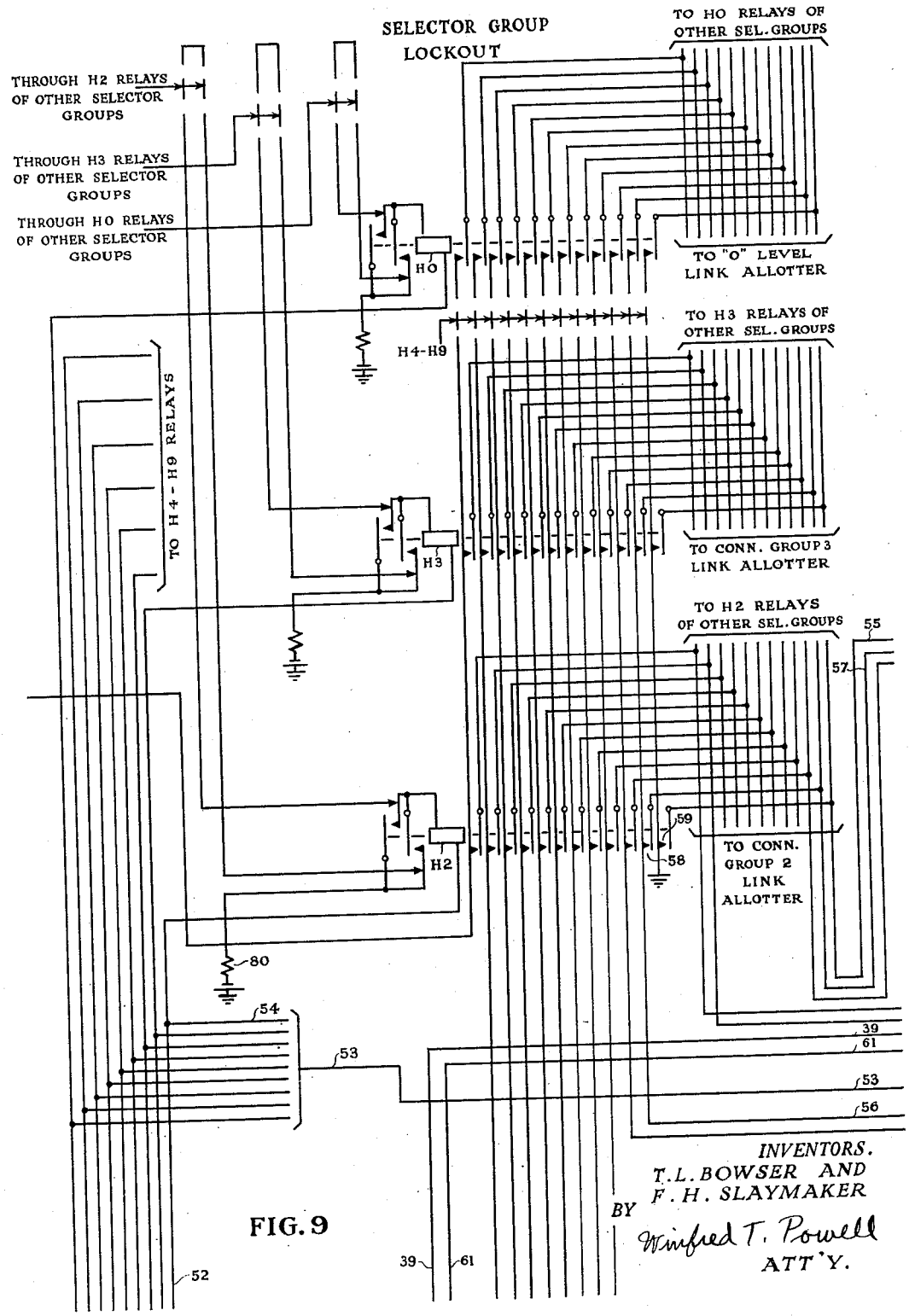
Figure 11:
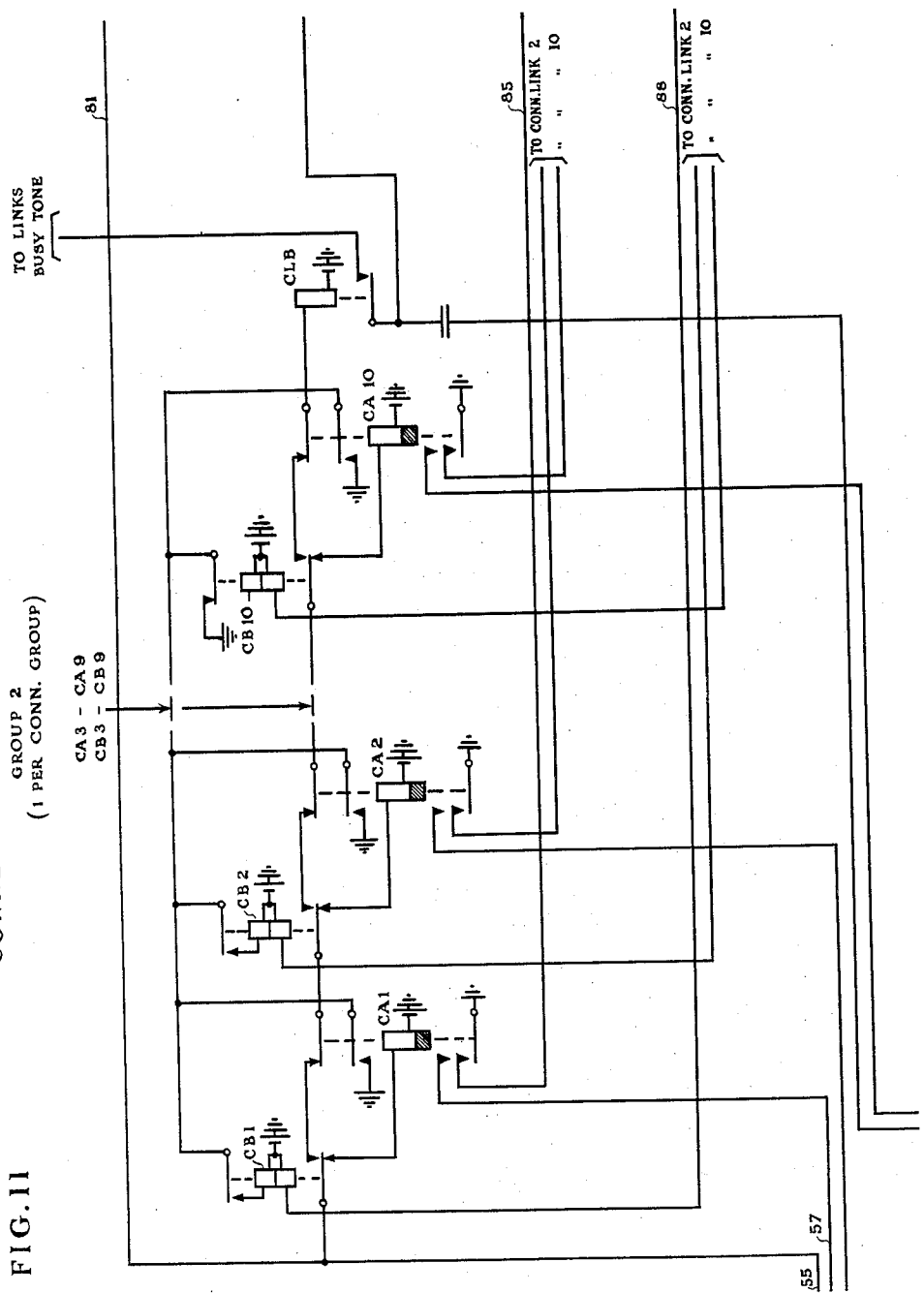
Figure 12:
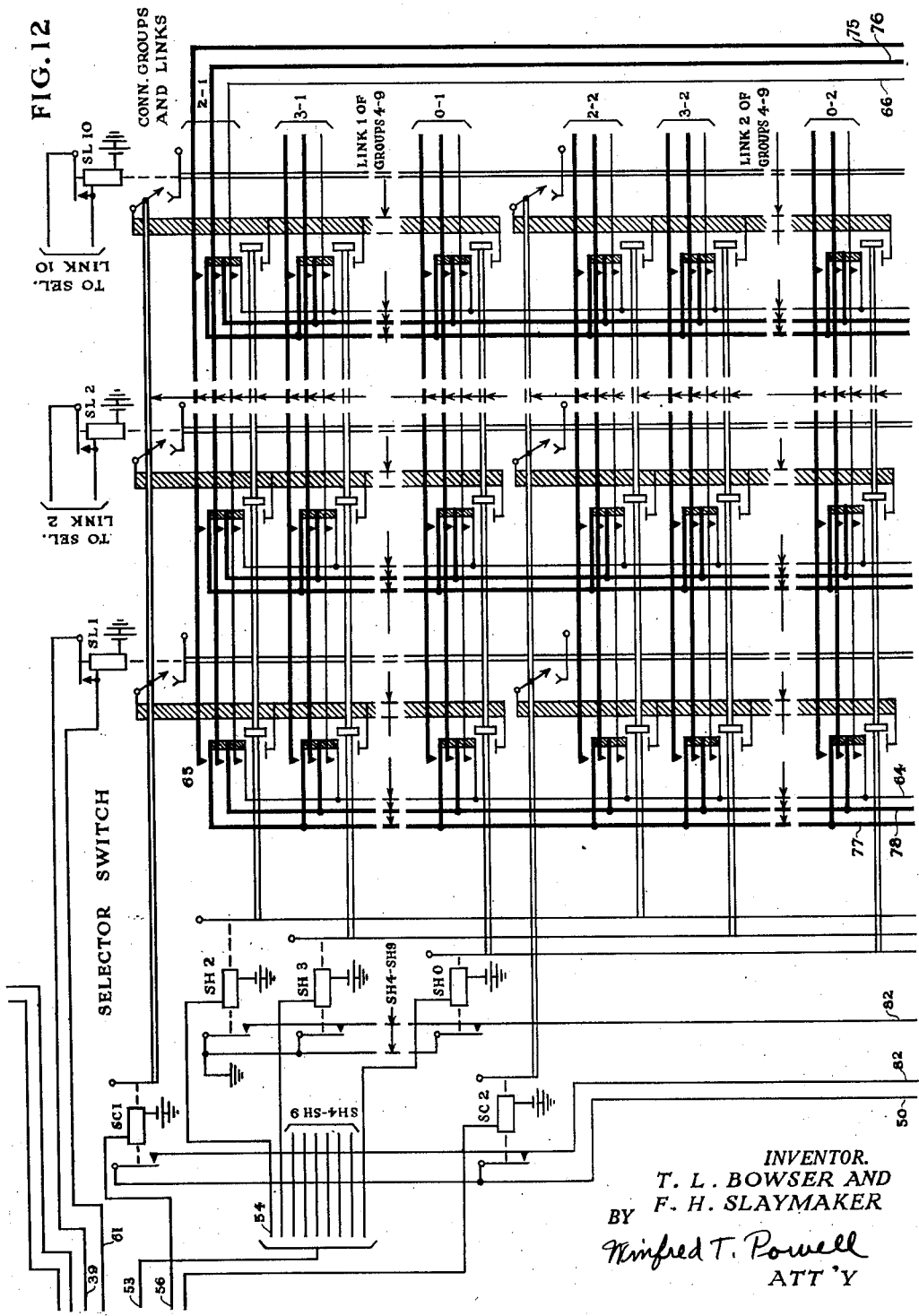
Figure 13:
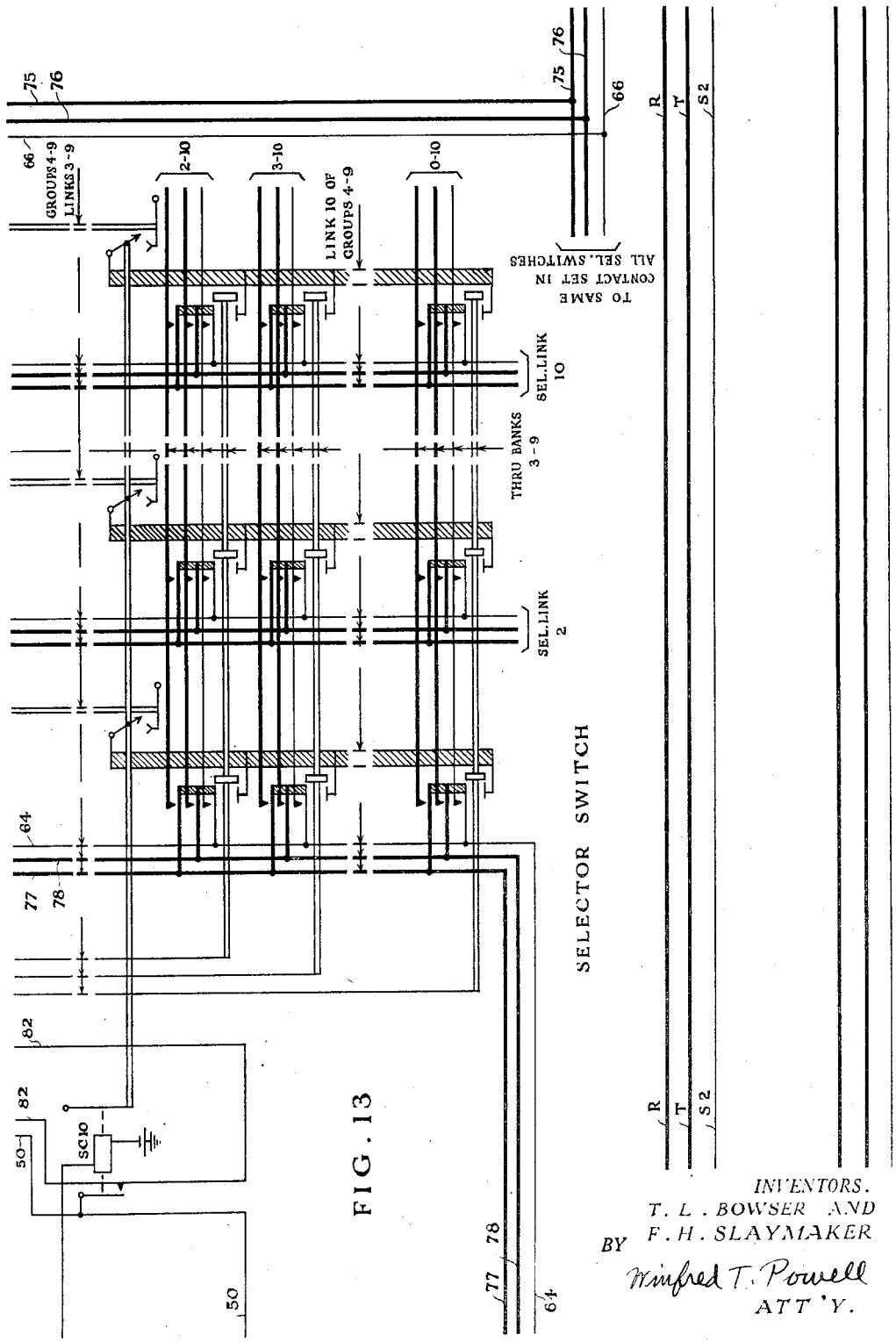
Figure 15:
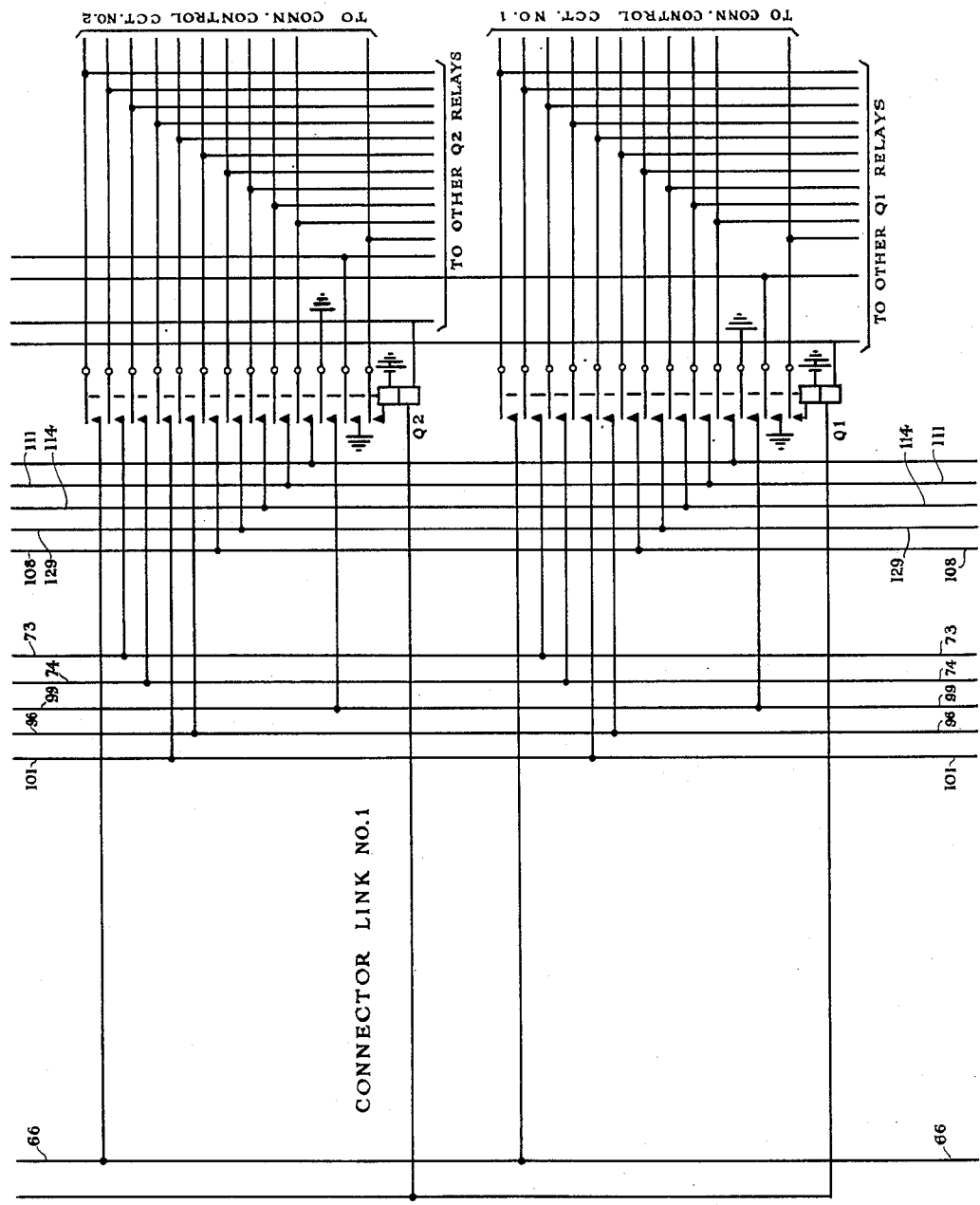

Relay 1G connects ground to conductor 39 (by way of 68, 67, 66, 65, 64 and 9) for the purpose of holding relay SL of the selector link locked operated and for holding relay LB1 of the selector link allotter, as well as magnet FL1 of the finder switch, because this ground is extended to conductor 32 which is connected to conductor 39 at the upper left-hand corner of Fig. 7. Relay IG also closes a locking circuit for magnet SLI of the selector switch, since conductor 39 is extended to the upper make contact of this magnet. Relay IG also closes a locking circuit for relay Q3, extending from ground, inner lower front contact of relay IG, outer lower back contact of relay BY, conductor 79, front contact 89 and upper winding of relay Q3 to battery. Relay IG also closes a locking circuit for relay IRS, extending from ground, inner lower front contact of relay IG, upper front contact of relay IRS, winding of relay IRS and resistance 86 to battery. Since the sleeve conductor 39 extends back through contact set 25 of the finder switch to conductor S1 of the calling line, the ground on conductor 39 is effective to hold relays ICO and ILO of the calling line circuit and since this circuit is connected through the right-hand front contact of relay ICO and the right hand back contact of relay ILR to conductor S2, this ground is extended to the terminal of this line in the connector bank for making it busy.

The calling subscriber now dials the tens digit which in this example is assumed to be No. 1. The release of relay IP of the connector control circuit closes a circuit for operating relay ID, extending from ground, upper back contact of relay IP, upper front contact of relay IG and winding of relay ID to battery. At the termination of this impulse, relay IP remains energized sufficiently long to permit relay ID to release. The release of relay IP at the beginning of this impulse also closes a circuit for operating tens counting relay KI which extends from ground, inner lower front contact of relay IG, lower back contact of relay IP, conductor 118, upper back contact of relay K, inner upper back contact of relay KI, winding of relay KI and resistance 119 to battery. This circuit extends to both terminals of the winding of relay K2, thus short circuiting and preventing the operation of this relay at this time. Relay KI closes a locking circuit for itself, extending from ground, inner lower front contact of relay IG, upper front contact of relay IRS, conductor 120, inner upper front contact of relay KI, winding of relay KI, and resistance 119 to battery. At the termination of this first impulse, relay K2 is operated because of the ground connected to the left-hand terminal of its winding (in multiple with relay KI) and because the ground connected to the right hand terminal of its winding is opened by the operation of relay IP.

A circuit is now closed for operating relay K which extends from ground, inner lower front contact of relay IG, back contact of relay ID, conductor 104, inner lower front contact of relay K2, lower back contact and winding of relay K to battery. Relay K is locked to ground on conductor 117 by way of the inner lower front contact of relay IG. It is not believed necessary to trace the circuits of the tens, units or stations counting relays, since these are exactly the same as already shown and described in connection with the counting relays of the selector control circuit.

The units digit is now transmitted and since it is assumed that two impulses will be sent for this digit, relay IP is impulsed twice. The first impulse transmitted for the units digit closes a circuit for operating relay LI of the units counter which extends from ground, inner lower front contact of relay IG, lower back contact of relay IP, conductor 118, upper front contact of relay K, upper back contact of relay L, inner upper back contact of relay LI, winding of relay LI and resistance 121 to battery. Relay LI is locked by way of its inner upper front contact to conductor 120 to which ground is connected as above traced. At the end of the first impulse, the operation of relay IP effects the operation of relay L2 in the same manner described for relay K2. At the beginning of the second impulse, the release of relay IP releases relay LI by short-circuiting its winding by means of ground connected to conductor 118 which extends through upper front contact of relay K, upper back contact of relay L and inner upper front contact of relay L2 to the point between resistance 121 and the winding of relay LI. The release of relay LI closes a circuit for operating relay L3 which extends from ground, inner lower front contact of relay IG, upper front contact of relay IRS, conductor 120, middle upper back contact of relay LI, outer upper front contact of relay L2, outer upper back contact of relay L4 and winding of relay L3 to battery. Relay L3 is locked to ground on conductor 120, middle upper back contact of relay L5, middle upper front contact and winding of relay L3 to battery. At the end of the second impulse relay IP is again operated and relay L2 is released because its locking circuit, including conductor 118, is opened at the lower back contact of relay IP.

Relay ID is again operated at the beginning of the transmission of the units digit and is released at the end of this transmission. Relay L is operated at the end of the units digit over a circuit extending from ground, inner lower front contact of relay IG, back contact of relay ID, conductor 104, inner lower front contact of relay L3, inner lower back contact and winding of relay L to battery. Relay L is locked to ground on conductor 117.

Since it is assumed that the No. 3 connector control circuit is used on this call, it now becomes necessary to operate relay CX3. This relay is operated over a circuit extending from ground, inner lower front contact of relay IG, conductor 117, outer, lower front contact of relay L, conductor 122, outer lower front contact of relay IRS, winding of relay CX3 and over the series circuit including back contacts of this and other CX relays to battery through resistance 123. Relay CX3 closes a locking circuit for itself by way of its upper front contacts and the series circuit is opened to prevent execution by any other connector control circuit at this particular time. The connector tens and units magnets corresponding to the called line number are now operated and since the called line is assumed to be No. 12, magnets CTI and CU2 will be operated. The circuit for operating magnet CTI extends from ground which is applied to the right hand terminal of the winding of relay CX3, inner lower front contact of relay CX3, conductor 90, outer lower back contact of relay K4, outer lower back contact of relay K6, lower front contact of relay KI, conductor 91 and winding of magnet CTI to battery. The circuit for operating magnet CU2 extends from ground on conductor 90, outer lower back contact of relay L4, outer lower back contact of relay L6, outer lower front contact of relay L3, conductor 93 and winding of magnet CU2 to battery. The operation of these two magnets of the connector switch prepares the mechanical linkages of this switch so that the called line will be connected to the ringing ciruit of the connector when the holding magnet CLI of the allotted connector switch is operated and when relay R of the connector link is operated as will be presently described.

Magnet CL1 is now operated over a circuit extending from ground front contact of magnet CT1, conductor 125, front contact of magnet CU2, outer lower front contact of relay CX3, conductor 98, front contact 97 of relay Q3, conductor 96 and winding of magnet CL1 to battery. Magnet CL1 closes a locking circuit for itself extending from ground, front contact 124 of relay Q3, conductor 99, upper front contact and winding of magnet CL1 to battery. Relay IRS is now short-circuited and released by means of a connection from ground to the point between its winding and resistance 86, which extends from ground, left-hand front contact of magnet CT1, conductor 125, left-hand front contact of magnet CU2, conductor 95 and outer lower front contact of relay CX3. The release of relay IRS effects the release of magnets CT1 and CU2 because the circuit of these magnets is opened at the outer lower front contact of relay IRS. This contact also opens up and releases relay CX3. The tens and units counting relays which were left operated are now released because their locking circuit, including conductor 120, is opened at the upper front contact of relay IRS.

A test is made of the called line before the release of relay IRS and if this line is busy, ground will be found on the sleeve conductor for operating relay BY of the connector control circuit. The sleeve conductor of the called line extends through the operated contact of the connector switch (for example 100). Conductor 101, front contact 102 of relay Q3, conductor 103, inner lower front contact of relay IRS and winding of relay BY to battery. Relay BY when operated locks by way of its inner lower front contact and the inner lower front contact of relay IG to ground. Busy tone is connected to the calling line, which is extended to the winding of relay IP, by way of the upper front contact of relay BY and condenser 126. The connector control circuit is held by the calling party under this condition until this party releases and it will be later described how the release under this condition effects the release of the various relays and magnets used on the extension of the call. It will now be assumed that the called line is idle and that the calling party transmits 3 impulses for the stations digit. Ground is connected to the sleeve conductor of the called line (for example conductor S2) for operating the cut-off and lock-out relays in series and for making this line busy. This ground is applied to conductor S2 when relay IRS releases and extends through the outer lower back contact of relay BY, inner back contact of relay IRS, conductor 103, front contact 102 of relay Q3, conductor 101, lower contact of connector contact set 100 and conductor S2.

The release of relay IP at the beginning of the first impulse of the stations digit closes a circuit for again operating relay ID and this latter relay is released at the end of the transmission of this series of impulses. A circuit is also closed at this time for operating relay M1 which extends from ground, inner lower front contact of relay IG, lower back contact of relay IP, conductor 118, upper front contact of relay K, upper front contact of relay L, conductor 127, upper back contact of relay M1, inner upper back contact of relay M1, winding of relay M1 and resistance 128 to battery. Relay M1 is locked to ground on conductor 117 by way of the inner lower front contact of relay IG. The transmission of these 3 impulses is effective to operate relays M1 to M4 inclusive over circuits which need not be pointed out in detail since the circuits are similar to these described in connection with the J relays of the selector control circuit.

Execution of the stations digit takes place when relay ID is released at the end of the transmission of the impulses of this digit by closing a circuit for operating relay M which extends from ground, inner lower front contact of relay IG, lower back contact of relay ID, conductor 104, inner lower front contact of any one of the relays M2, M3 or M4, inner lower back contact and winding of relay M to battery. Relay M is locked to ground on conductor 117 which is applied at the inner lower front contact of relay IG.

The record set up on the stations counter is now transferred to the connector link and in above example, relays M1 to M4 inclusive are left operated, so that relays R1 and R2 of the connector link will be operated. The circuit for operating relay R1 extends from ground, outer lower front contact of relay M, middle lower front contact of relay M2, second lower front contact of relay M3, inner lower back contact of relay M6, conductor 112, front contact 113 of relay Q3, conductor 114 and winding of relay R1 to battery. The circuit for operating relay R2 extends from ground, outer lower front contact of relay M, middle lower front contact of relay M2, second lower front contact of relay M4, conductor 109, front contact 110 of relay Q3, conductor 111 and winding of relay R2 to battery. A circuit is also closed for operating relay R which extends from ground, outer lower front contact of relay M, conductor 105, middle lower back contact of relay M, conductor 105, middle lower back contact of relay BY, conductor 106, front contact 107 of relay Q3, conductor 108 and winding of relay R to battery. The operation of relay R closes a locking circuit for itself extending from ground, outer left-hand back contact of relay CL, lower back contact of relay C, lower back contact of relay A, inner upper front contact and winding of relay R to battery. Relay R applies ground by way of its second upper front contact to the circuit which locks the R relays which were operated, including relays R1 and R2 above described.

The selected frequency, in this case frequency #3, is now applied to the called line over a circuit extending from the common frequency generator No. 3, middle lower back contact of relay R3, inner lower front contact of relay R2, lower front contact of relay R1, inner lower back contact of relay RV, inner lower front contact of relay R, conductor 116, contact set 100 of the connector switch, conductor R and over the called line and sub-station in series, conductor T, contact set 100, conductor 115, second lower front contact of relay R, outer lower back contact of relay RV and winding of trip relay TR to the generator ground common. It will be noted that generator is applied to the ring (R) side of the called line. In the event that more than five impulses are dialed for the stations digit, relay RV is operated for reversing the ringing connection to the called line for ringing over the tip (T) side.

It is not believed necessary to trace out the detailed circuits for transferring the record on the M relays to the R relays of the connector link, since the circuits may be readily traced for the various combinations in accordance with the following table:

| Station digit dialed | Operated (M) relays | Operated conn. link relays | Ringing voltage selected |
|---|---|---|---|
| 1 | 1, 2, | None | Freq. 1, normal |
| 2 | 3, | R1 | Freq. 2, normal |
| 3 | 1, 2, 3, 4, | R1, R2 | Freq. 3, normal |
| 4 | 3, 4, 5 | R1, R2, R3 | Freq. 4, normal |
| 5 | 1, 2, 3, 4, 5, 6 | R2, R3 | Freq. 5, normal |
| 6 | 4, 5, 6, | RV | Freq. 1, reversed |
| 7 | 1, 2, 5, 6, | RV, R3 | Freq. 2, reversed |
| 8 | 3, 6, | RV, R1, R2, R3 | Freq. 3, reversed |
| 9 | 1, 2, 3, 4, 6, | RV, R2, R3 | Freq. 4, reversed |
| 0 | 3, 4, 6, | RV, R2, R3 | Freq. 5, reversed |

The operation of relay R of the connector link switches the calling line circuit, which is connected to conductors 75, and 76, to the windings of relay A. This is effected at the outer upper make-before-break front contacts of relay R, resulting in the operation of relay A which in turn closes an obvious circuit for operating relay C. The opening of the back contacts of the make-before-break combinations of relay R disconnects the calling line from the circuit extending by way of conductors 73 and 74 to relay IP of the connector control circuit, which is effective to release this relay which in turn effects the release of relay IG. During the interval between the release of relay IP and relay IG, a circuit is closed for operating relay ID but this relay performs no function at this time.

Figure 16:
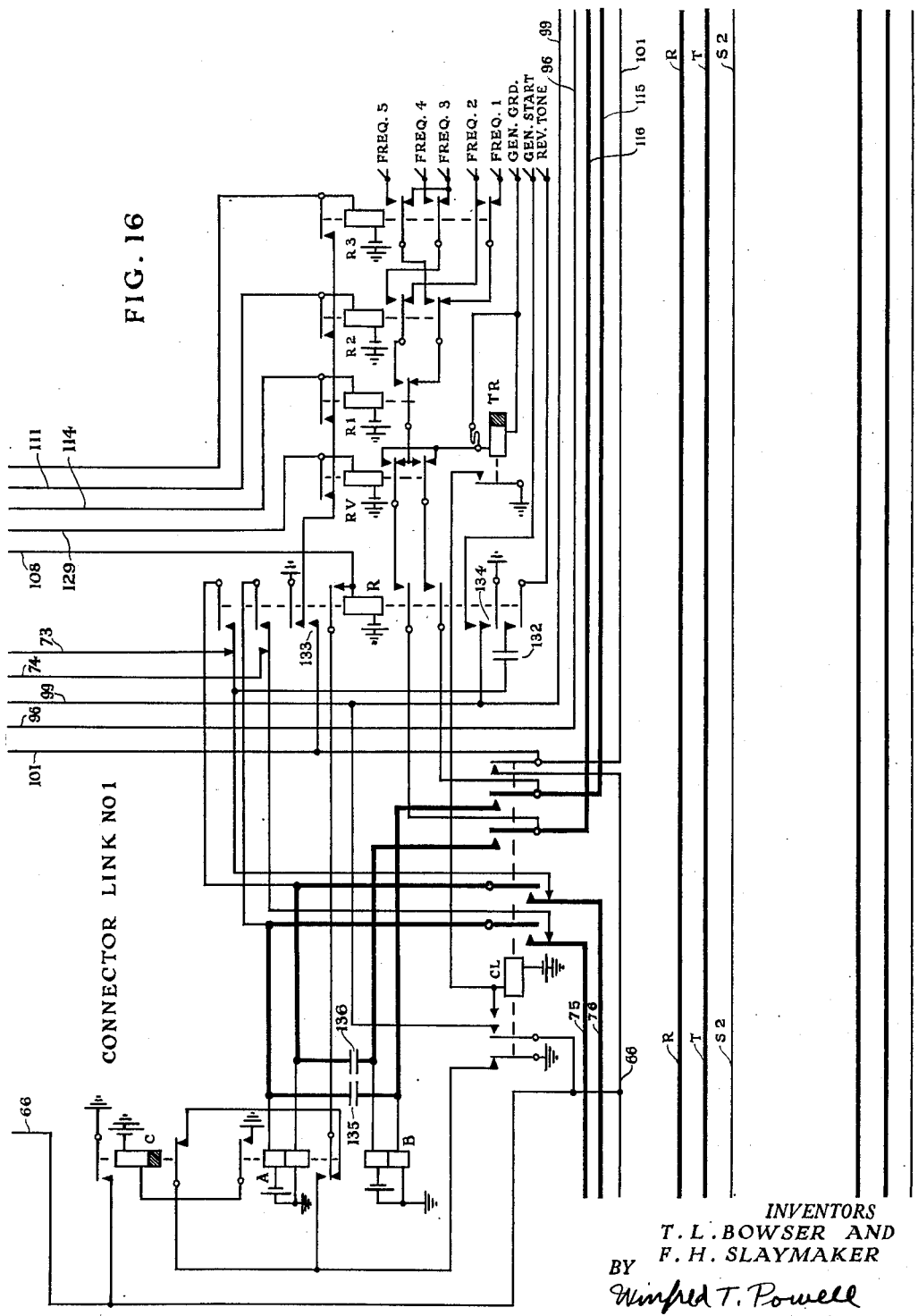
Figure 17:
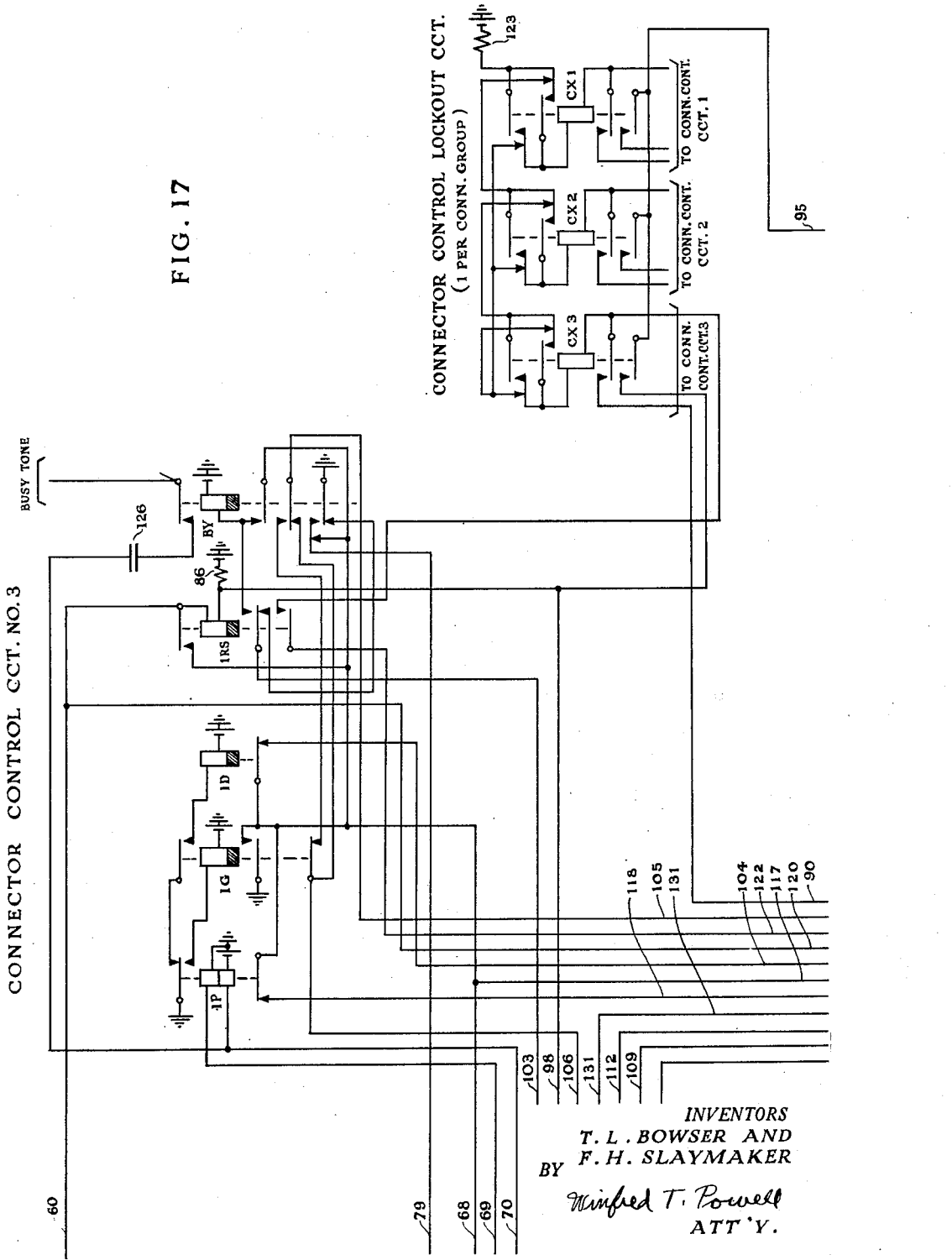
Figure 18:
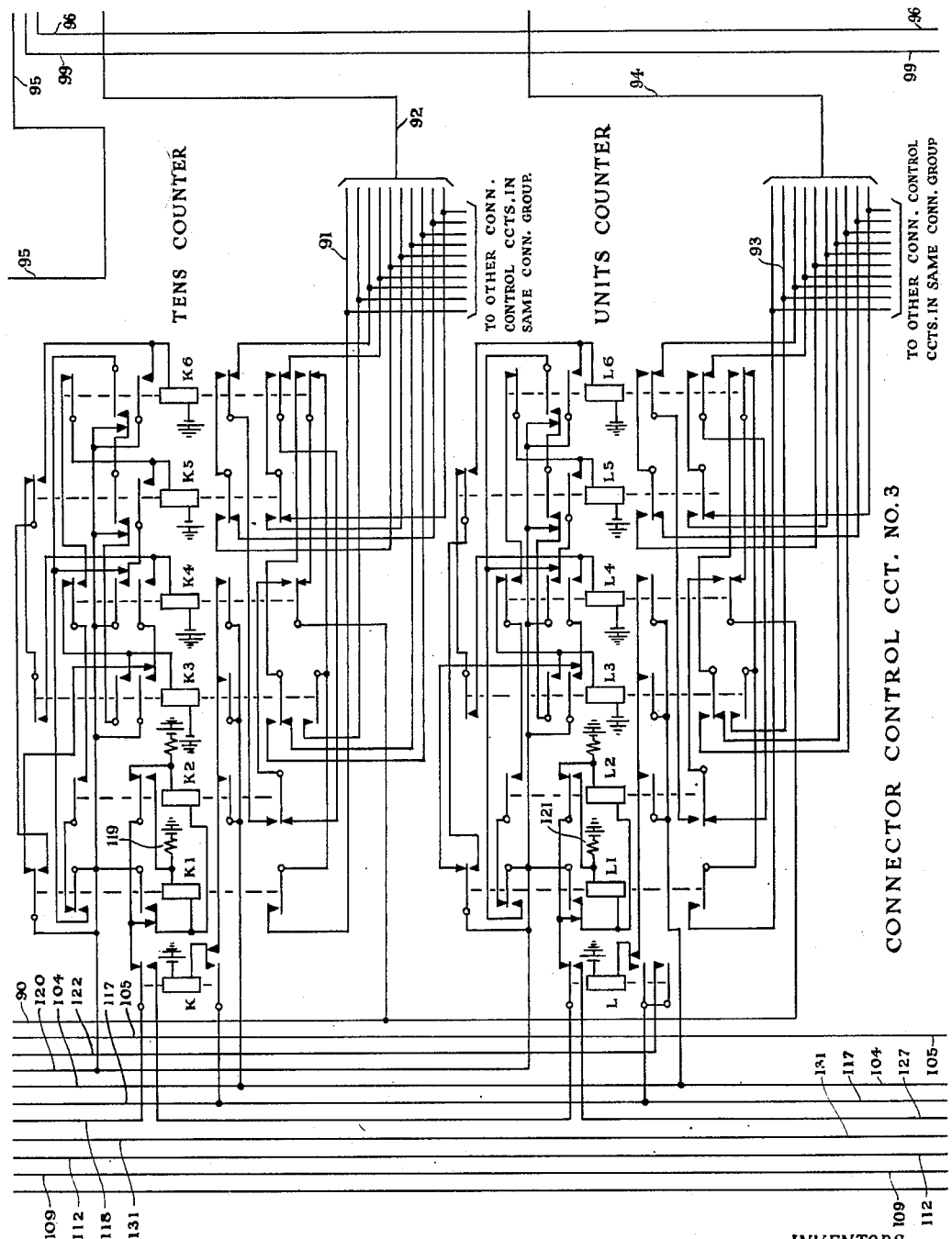
Figure 19:
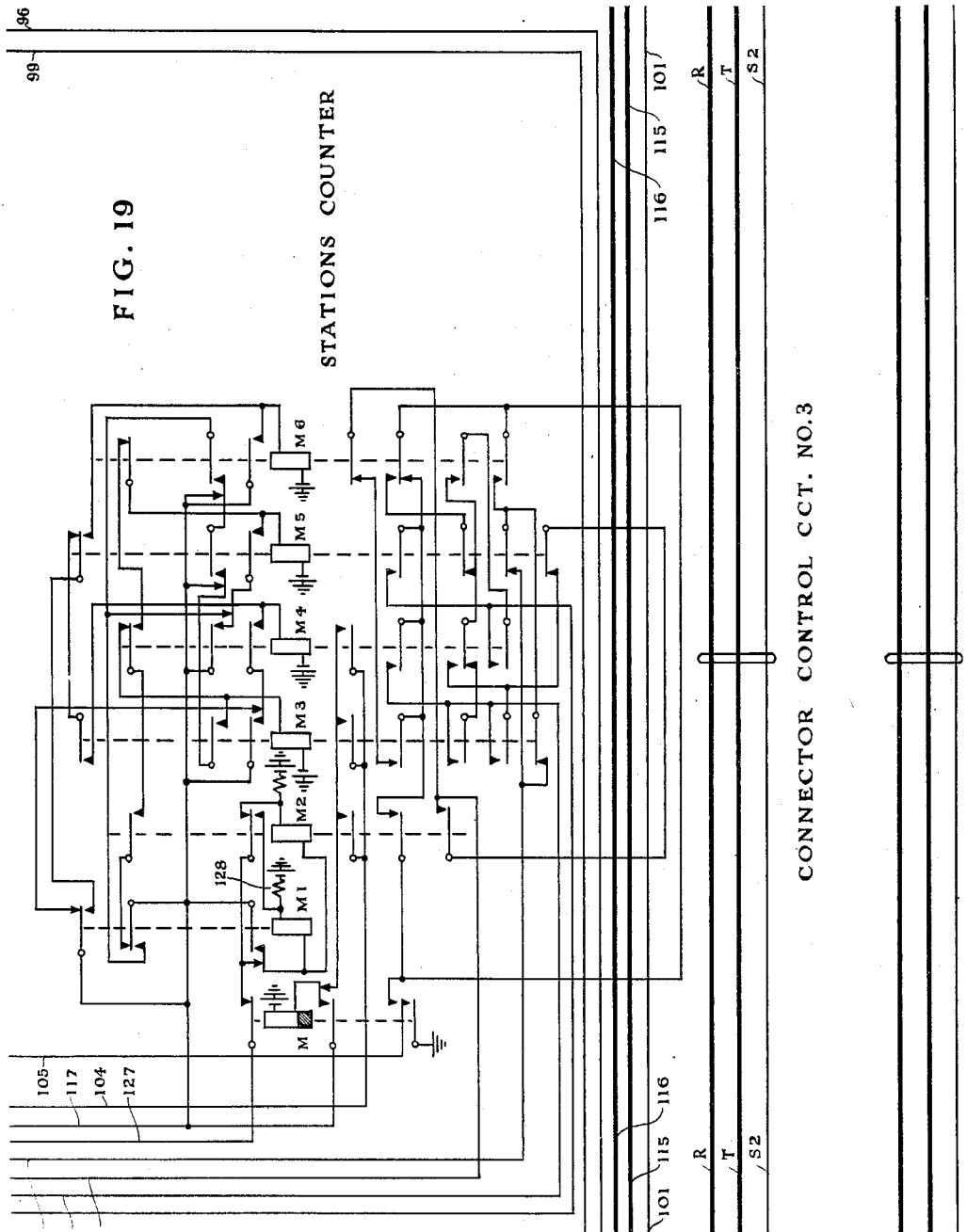
Figure 20:
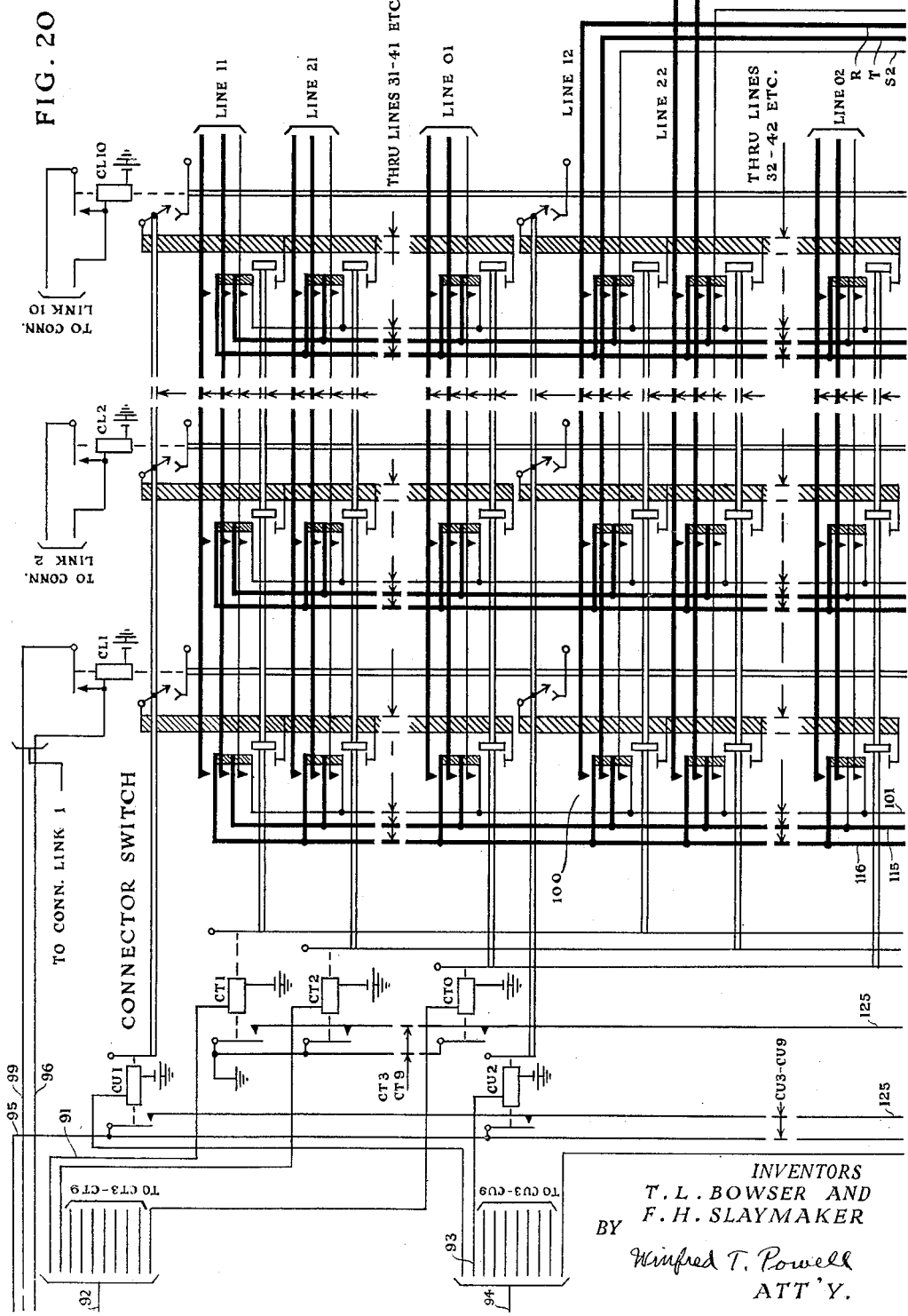

Revertive ringing tone is applied to the calling line during the ringing operation and extends from the revertive ringing tone common of Fig. 16, outer lower front contact of relay R, condenser 132 and conductor 76 to the calling line.

By referring to the above table, it will be noted that relay RV of Fig. 16 is operated in the event that the stations digit is 6 or more. The circuit for operating relay RV extends from ground, outer lower front contact of relay M, through the various contact combinations of the M relays to conductor 131, front contact 130 of relay Q3, conductor 129, and winding of relay RV to battery. Relay RV is locked by way of its upper front contact to ground at front contact 133, of relay R. It is not believed necessary to trace out all of these circuits for relay RV, since they may be readily traced by means of the above table. However, it will be assumed that the station digit was No. 6 which was effective to leave relays M4, M5, and M6 operated. The circuit now extends from ground, outer lower front contact of relay M, outer lower front contact of relay M6, outer lower back contact of relay M3 and conductor 131 to relay RV over the above described circuit.

Referring back to the operation of relay R of the connector link, this relay applies ground at its front contact 133 to conductor 101 which extends to conductor S2 of the called line by way of the connector switch contact set 100. This ground is a substitute for the ground on conductor 101 by way of front contact 102 of relay Q3, which contact will be opened when Q3 is released as will be presently described. Relay R applies ground to the locking circuit of relay CL1 of the connector switch, over a circuit extending through front contact 134, conductor 99, and locking contact of relay CL1. This is a substitute ground for that previously described for locking magnet CL1 which will be opened by the release of relay Q3.

When relay IG of the connector control circuit is released as above described, the K, L, M (and any stations counter relays from M1 to M6 inclusive which were left operated) are released, because ground is removed from conductor 117 by the opening of inner lower front contact of relay IG. Relay Q3 is also released at this time because its locking circuit, including conductor 79, is opened at the inner lower front contact of relay IG. Relay CD3 of the connector control allotter is released by the opening of front contact 87 of relay Q3. Relay IG also removes ground from conductor 68, which extends back by way of front contact 67 of relay Q3 and conductor 88 to the winding of relay CB1 of the connector link allotter, but this circuit also extends by way of conductor 66 to the connector link circuit and since relay C is operated, ground is connected through its upper make contact to this conductor for maintaining relay CL of the connector link locked and relay CB1 operated after the release of relay IG. Conductor 66 is the sleeve conductor extending back through the operated contact set of the selector switch to conductor 64. Consequently, the grounding of conductor 66 by relay C holds the calling cut-off and lock-out relays operated by grounding this conductor before relay IG is released. This same conductor 66 is extended to conductors 39 and 32 and includes the locking circuit for magnet FL1 of the finder, for relay SL of the selector link, for magnet SL1 of the selector switch and the holding circuit for relay LB1 of the finder link allotter, so that these circuits are maintained at ground potential by the operation of relay C before the ground is removed by the release of relay IG.

The connector control circuit is now in its normal condition, ready for use on another call and the calling line is connected by way of the back contacts of the make-before-break combinations of relay CL and the front contacts of the make-before-break combinations of relay R to relay A. When the called party answers, the closed circuit across the called line effects the operation of relay TR which closes an obvious circuit for operating relay CL and this latter relay locks to ground at the upper front contact of relay C. The operation of relay CL effects the release of relay R by opening its locking circuit which extends through lower front contact of relay A and outer left-hand back contact of relay CL. The release of relay R opens the above described locking circuits of the RV, R1, R2 and R3 relays (whichever were left operated) and these relays are released. The release of relay R disconnects the circuits of the frequency generators from conductors 115 and 116 and the operation of relay CL extends these conductors to the windings of battery feed coil B which supplies talking current to the called station. The calling and called stations are connected for conversation by means of condensers 135 and 136.

Release of the connection is controlled by the calling party hanging up the receiver to effect the release of relays A and C in sequence. The release of relay C removes ground from conductor 66 which effects the release of relay CL of the connector link, relays ICO and ILO of the calling line, magnet SL1 of the selector switch, relay SL of the selector link, magnet FL1 of the finder switch and relays LB1 and CB1 of the finder link allotter and the connector link allotter if the last allotter of each of these groups is in condition to permit the release of these relays.

It will now be assumed that the calling line is busy and relay BY of the connector control circuit is operated and locked as already described. Relay IRS of the connector control circuit is released and magnet CLI of the connector switch is operated when the CT and CU magnets are operated and this effects the release of relay CX3, relay BY locks relay Q3 by way of conductor 79. The K1 to K6 and the L1 to L6 relays are released by the removal of ground from conductor 120 and the CT and CU magnets are released by the removal of ground from conductor 96. This releases the connector switch and places it in condition for handling another call. If the calling subscriber hangs up when hearing the busy signal without dialing the stations digit, relays IP and IG of the connector control circuit will release and the connection will be cleared out when relay IG removes ground from conductors 68 and 117. In the event that the calling party dials the station digit after hearing the busy signal, the stations counter relays will be operated as before and at the end of the stations digit relay M will be operated. The record on the M relays will be transferred to the R relays of the connector circuit as before, but in this instance relay R of the connector will not be operated because the ground on conductor 105 from relay M is not extended to conductor 106 because of the open middle lower back contact of relay BY. In this case, when relays IP and IG of the connector control circuit are released, ground is removed from conductors 68 and 66 by relay IG and no substitute ground is provided for conductor 66 by relay C, so that the connection is released by de-energizing the operated relays and magnets connected to this conductor.

When relay IG is released during the clearing out period, ground on conductor 105 is maintained for a comparatively long time interval because relay M is slow acting and this ground is extended through the middle lower front contact of relay BY (also slow acting) and lower back contact of relay IG, conductor 106, front contact 107 of relay Q3 and conductor 108 to relay R of the connector link. This operates relay R but since the called line is busy, relay TR operates and closes the circuit for operating relay CL which in turn opens the locking circuit of relay R extending through the lower contact of relay A, so that relay R will be released before its locking circuit is closed. Relays TR and CL now release and any R relays of the connector link circuit which may have been operated are likewise released. It will be understood that relay IG controls the release of relay BY and relay BY effects the release of relay Q3 which in turn releases relay CD3 and magnet CLI. The K, L and M relays are released by the release of relay IG which removes ground from conductor 117.

*Reverting call*

When calling a party on the same line, the calling subscriber calls the regular number, including the stations digit, and since this call is to the line originating the call, it tests busy and busy tone will be applied as previously described. The calling subscriber is instructed to hang up, wait a reasonable time for the called party to answer and then come in on the line again. Hanging up the receiver causes relays IP and IG to release and relay ID to be operated and released, all as previously described. The release of relay IG removes ground from the holding lead 39 extending back to the line finder which is effective to release magnet FLI of the finder switch, relay SL of the selector link and magnet SLI of the selector switch. Relay LBI of the finder link allotter will likewise be released unless this relay is locked because the tenth link is not in use.

The release of relay IG opens up the locking circuit of relay BY and this latter relay is released after a short time interval due to its slow acting characteristics. Relay M of the stations counter is also slow to release. Consequently, a circuit is closed for operating relay R of the connector link which extends from ground, outer lower front contact of relay M, conductor 105, middle lower front contact of relay BY, outer lower back contact of relay IG, conductor 106, front contact 107 of relay Q3, conductor 108 and winding of relay R to battery. The operation of relay R connects ringing current to the line as previously described and also completes the locking circuit for the operated RV, R1, R2 and R3 relays (whichever are operated) and also connects a substitute ground on conductor 99 for locking magnet CLI of the connector switch. The distinction between this call and a call to a busy line is when relay R is operated on a reverting call, there is no closed circuit on the called line and thus ringing takes place instead of being immediately tripped as was described in connection with a call to a busy line. Since the connector is connected to the same line which originated the reverting call, the opening of the S conductor back through the line finder switch to the line circuit when relay IG releases, does not release relays ICO and ILO, these latter relays being held energized by ground on the S conductor from the connector switch. When relay BY finally releases, relay Q3 is released which in turn releases relay CD3.

When the called party answers (or the calling party comes in on the line again) relay TR operates, in turn operating relay CL which locks and releases relay R which in turn disconnects the ringing current from the line and releases relays TR and CL, magnets CLI and relay CBI, all as previously described, which restores all circuits to normal except the line circuit used on this call. The release of the connector link relays and the connector switch SL magnet removes the ground from the S conductor leading back to the line circuit, which is effective to release relay ICO, but not relay ILO because this latter relay is slow acting. The release of relay ICO connects the closed line circuit to battery through the windings of relay IL, this relay immediately operates and locks relay ILO, over an obvious circuit through the lower front contacts of relay ILO and the inner lower front contact of relay IL. Talking is fed to both stations through the windings of relay IL and this line is made busy to other calls over a circuit including the outer lower front contact of relay IL to the S lead to the connector terminal of this line.

Having thus described a new and novel form of a cross bar switch mechanism and the circuits for using such mechanism in an automatic telephone system as one specific embodiment of the present invention, it is desired to be understood that this particular form is selected to facilitate in the disclosure of the invention rather than to limit the number of forms which it may assume; and it is to be further understood that various modifications, adaptations and alterations may be applied to the specific form shown to meet the requirements of practice without in any manner departing from the spirit or scope of the present invention except as limited by the appended claims.

What is claimed is:

1. In a telephone system, a cross bar switch, a group of lines and a plurality of trunks appearing in the contact sets of said switch, a plurality of units magnets each common to all lines of said group having the same units digit, a plurality of tens magnets each common to all lines of said group having the same tens digit, means controlled over a calling line for operating the units and tens magnets common to this line, a trunk magnet individual to each trunk of said plurality, means controlled by the operation of said units and said tens magnets for operating a trunk magnet associated with an idle trunk, means controlled by the operation of said trunk magnet for operating only the contact set which connects said calling line to said idle trunk, and lockout means including contacts directly actuated by said units and said tens magnets for preventing the operation of more than one of each of said magnets at any one time.

2. In a telephone system, a cross bar connector switch for selectively connecting calling lines to called lines, means responsive to a calling condition on one of said calling lines for connecting said one calling line to said cross bar connector switch, a connector control circuit, means responsive to the connection of said calling line to said cross bar connector switch for associating said connector control circuit with said cross bar connector switch, means responsive to the dialing operation over said calling line for recording the called line number in said connector control circuit, means including said connector control circuit for causing said cross bar switch to select a called line in accordance with said called line number, means for connecting said calling line to said called line by way of said cross bar switch, means for disassociating said connector control circuit from said cross bar connector switch and rendering said connector control circuit selectable for another call, and means including said cross bar connector switch and said connector control circuit for effecting a second connection from another calling line to another called line while the first connection is maintained.

3. In a cross bar switch, a plurality of sets of contacts, a rotatable bar, a plurality of selecting fingers secured to said rotatable bar, a slidable bar, a plurality of selecting sleeves secured to said slidable bar, means for rotatably actuating said rotatable bar, means for slidably actuating said slidable bar, means including said rotatable bar for selectively actuating said sleeves, and means including said sleeves for selectively actuating said contact sets.

4. In a cross bar switch, a plurality of sets of contacts, a plurality of rotatable bars, a plurality of selecting fingers secured to each rotatable bar, a slidable bar, a plurality of selecting sleeves secured to said slidable bar, means for selectively actuating said rotatable bars, means for slidably actuating said slidable bar, means including said rotatable bars for selectively actuating said sleeves, and means including said sleeves for selectively actuating said contact sets.

5. In a cross bar switch, a plurality of sets of contacts, a plurality of rotatable bars, a plurality of selecting fingers secured to each rotatable bar, a plurality of slidable bars, a plurality of selecting sleeves secured to each slidable bar, means for selectively actuating said rotatable bars, means for selectively actuating said slidable bars, means including said rotatable bars for selectively actuating said sleeves, and means including said sleeves for selectively actuating said contact sets.

6. In a cross bar switch, a plurality of contact sets arranged in vertical and horizontal rows, a plurality of units selecting fingers, a plurality of units operating magnets for selectively operating said units selecting fingers to positions corresponding to the vertical rows of said contact sets, a plurality of tens selecting fingers, a plurality of tens operating magnets for selectively operating said tens selecting fingers to positions corresponding to the horizontal rows of said contact sets, means for selectively operating said units and said tens operating magnets in various combinations for preparing mechanical linkages for said contact sets, an electro-magnetically controlled contact closing bar for each vertical row of said contact sets, and means for selectively operating said contact closing bars whereby the prepared mechanical linkages are completed for selectively operating said contact sets.

7. In a cross bar switch, a plurality of contact sets arranged in vertical and horizontal rows, a plurality of units selecting fingers, a plurality of units operating magnets for selectively operating said units selecting fingers to positions corresponding to the vertical rows of said contact sets, a plurality of tens operating magnets for selectively operating said tens selecting fingers to positions corresponding to the horizontal rows of said contact sets, means for selectively operating said units and said tens operating magnets in various combinations for preparing mechanical linkages for said contact sets, a plurality of electro-magnetically controlled contact closing bars for said contact sets, and means for selectively operating said contact closing bars whereby the prepared mechanical linkages are completed for selectively operating said contact sets.

8. In a cross bar switch, a plurality of contact sets arranged in vertical and horizontal rows, a plurality of units selecting fingers, a plurality of units operating magnets for selectively operating said units selecting fingers to positions corresponding to the vertical rows of said contact sets, a plurality of tens selecting fingers, a plurality of tens operating magnets for selectively operating said tens selecting fingers to positions corresponding to the horizontal rows of said contact sets, means for selectively operating said units and said tens operating magnets in various combinations for preparing mechanical linkages for said contact sets, a plurality of electro-magnetically controlled contact closing bars for said contact sets, means for selectively operating said contact closing bars whereby the prepared mechanical linkages are completed for selectively operating said contact sets, means for releasing said units and said tens operating magnets, and means controlled by the operated electromagnetically controlled contact closing bar for locking the operated contact set in circuit closing position after the release of said units and said tens operating magnets.

9. In a cross bar switch, a plurality of contact sets arranged in vertical and horizontal rows, a primary vertical magnet common to said vertical rows and a secondary vertical magnet individual to each of said vertical rows, a horizontal magnet common to a plurality of said horizontal rows, means for selectively operating said primary and said secondary vertical magnets and said horizontal magnet, means controlled by the selective operation of said primary vertical magnets and said horizontal magnet for pre-selecting a contact set in each vertical row, and means controlled by the selective operation of said secondary vertical magnet for operating the pre-selected contact set only in the vertical row associated with the operated secondary vertical magnet.

10. In a cross bar switch, a plurality of contact sets arranged in vertical and horizontal rows with the contact sets in each vertical row being arranged in a plurality of groups, a plurality of primary vertical magnets common to said vertical rows and a secondary vertical magnet individual to each of said vertical rows, a horizontal magnet common to a plurality of said horizontal rows, means for selectively operating said primary and said secondary vertical magnets and said horizontal magnet, means controlled by the selective operation of said primary vertical magnets for pre-selecting the groups in said vertical rows, means controlled by the selective operation of said primary vertical magnets and said horizontal magnet for pre-selecting a contact set in each vertical row, and means controlled by the selective operation of said secondary vertical magnet for operating the pre-selected contact set only in the vertical row associated with the operated secondary vertical magnet and only in the group in the vertical row associated with the operated primary vertical magnet.

11. In a cross bar switch, a plurality of contact sets arranged in vertical and horizontal rows with the contact sets in each vertical row being arranged in a plurality of groups, a plurality of primary vertical magnets common to said vertical rows and a secondary vertical magnet individual to each vertical row, a horizontal magnet common to a plurality of said horizontal rows, means for selectively operating said primary and said secondary vertical magnets and said horizontal magnet, means controlled by the selective operation of said primary vertical magnets for pre-selecting the groups in said vertical rows, means controlled by the selective operation of said primary vertical magnets and said horizontal magnet for pre-selecting a contact set in each vertical row, means controlled by the selective operation of said secondary vertical magnet for operating the pre-selected contact set only in the vertical row associated with the operated secondary vertical magnet and only in the group in the vertical row associated with the operated primary vertical magnet, and means controlled by the operated secondary vertical magnet for holding the operated contact set in its operated position regardless of the operated or non-operated conditions of said primary vertical magnets and said horizontal magnet.

12. A telephone system including a plurality of subscriber's lines, a plurality of stations on said lines, a link circuit having an answering end and a calling end for interconnecting said lines or for connecting both of said ends to the same line, a source of ringing current for ringing the stations on said lines, and means including said source of ringing current for discriminating between the interconnection of separate lines by said link circuit and the connection of both ends of said link circuit to the same line.

THERON L. BOWSER.
FRANK H. SLAYMAKER.